US012634512B2

(12) United States Patent
Chen et al.

(10) Patent No.: US 12,634,512 B2
(45) Date of Patent: May 19, 2026

(54) IMAGE PREDICTION METHOD AND APPARATUS

(71) Applicant: HUAWEI TECHNOLOGIES CO., LTD., Shenzhen (CN)

(72) Inventors: Huanbang Chen, Shenzhen (CN); Sixin Lin, Shenzhen (CN); Hong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/767,603

(22) Filed: Jul. 9, 2024

(65) Prior Publication Data

US 2025/0008146 A1     Jan. 2, 2025

Related U.S. Application Data

(63) Continuation of application No. 17/540,928, filed on Dec. 2, 2021, now Pat. No. 12,058,365, which is a
(Continued)

(30) Foreign Application Priority Data

Sep. 29, 2015     (CN) .......................... 201510632589.1

(51) Int. Cl.
     *H04N 19/52*          (2014.01)
     *H04N 19/105*         (2014.01)
     (Continued)

(52) U.S. Cl.
     CPC ........... *H04N 19/52* (2014.11); *H04N 19/105* (2014.11); *H04N 19/107* (2014.11); *H04N 19/44* (2014.11); *H04N 19/70* (2014.11); *H04N 19/54* (2014.11)

(58) Field of Classification Search
     None
     See application file for complete search history.

(56) References Cited

U.S. PATENT DOCUMENTS

| 9,055,300 B2 | 6/2015 | Lee et al. |
| 2007/0071100 A1 | 3/2007 | Shi et al. |
(Continued)

FOREIGN PATENT DOCUMENTS

| CA | 2830242 A1 | 9/2012 |
| CN | 101854545 A | 10/2010 |
(Continued)

OTHER PUBLICATIONS

U.S. Appl. No. 17/540,928, filed Dec. 2, 2021.
(Continued)

*Primary Examiner* — Clifford Hilaire
(74) *Attorney, Agent, or Firm* — Leydig, Voit & Mayer, Ltd.

(57)          ABSTRACT

An image prediction method and apparatus is disclosed. The image prediction method includes: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parsing a bitstream to obtain first indication information; determining, in the set of candidate prediction modes, a prediction mode for the to-be-processed image unit according to the first indication information; and determining a predicted image of the to-be-processed image unit
(Continued)

500

Parse a bitstream to obtain first indication information — S510

Determine a set of candidate modes for a first to-be-processed image area according to the first indication information — S520

Parse the bitstream to obtain second indication information — S530

Determine, in the set of candidate prediction modes for the first to-be-processed image area, a prediction mode for a to-be-processed image unit according to the second indication information — S540

Determine a predicted image of the to-be-processed image unit according to the prediction mode — S550 according to the prediction mode. The method reduces a bit rate of encoding a prediction mode, thereby improving encoding efficiency.

12 Claims, 7 Drawing Sheets

Related U.S. Application Data continuation of application No. 15/923,434, filed on Mar. 16, 2018, now Pat. No. 11,323,736, which is a continuation of application No. PCT/CN2016/098464, filed on Sep. 8, 2016.

(51) Int. Cl.

| | |
|---|---|
| *H04N 19/107* | (2014.01) |
| *H04N 19/44* | (2014.01) |
| *H04N 19/54* | (2014.01) |
| *H04N 19/70* | (2014.01) |

(56) References Cited

U.S. PATENT DOCUMENTS

| | | | |
|---|---|---|---|
| 2011/0176014 A1 | 7/2011 | Hong et al. | |
| 2012/0195368 A1 | 8/2012 | Chien et al. | |
| 2012/0320969 A1 | 12/2012 | Zheng et al. | |
| 2013/0077689 A1 | 3/2013 | Lim et al. | |
| 2013/0279577 A1 | 10/2013 | Schwarz et al. | |
| 2017/0188041 A1 | 6/2017 | Li et al. | |
| 2017/0195685 A1 | 7/2017 | Chen et al. | |
| 2017/0214932 A1* | 7/2017 | Huang | H04N 19/70 |
| 2017/0347116 A1 | 11/2017 | Lin et al. | |
| 2017/0366821 A1 | 12/2017 | Schwarz et al. | |
| 2018/0041768 A1 | 2/2018 | Koo et al. | |
| 2018/0220149 A1* | 8/2018 | Son | H04N 19/182 |

FOREIGN PATENT DOCUMENTS

| | | | |
|---|---|---|---|
| CN | 102377992 A | 3/2012 |
| CN | 102934440 A | 2/2013 |
| CN | 103609123 A | 2/2014 |
| CN | 104363451 A | 2/2015 |
| CN | 104539966 A | 4/2015 |
| CN | 104661031 A | 5/2015 |
| CN | 105163116 B | 7/2018 |
| CN | 106303543 B | 10/2018 |
| CN | 106331722 B | 4/2019 |
| EP | 1158806 A1 | 11/2001 |
| EP | 2645720 A2 | 10/2013 |
| EP | 2683165 A1 | 1/2014 |
| JP | 3654664 B2 | 6/2005 |
| JP | 2005333663 A | 12/2005 |
| JP | 2012080151 A | 4/2012 |
| JP | 2020031872 A | 3/2020 |
| JP | 6882560 B2 | 6/2021 |
| KR | 101527666 B1 | 6/2015 |
| RU | 2496252 C2 | 10/2013 |
| RU | 2550554 C2 | 5/2015 |
| WO | 2011013253 A1 | 2/2011 |
| WO | 2012102927 A1 | 8/2012 |
| WO | 2012177387 A1 | 12/2012 |
| WO | 2013068547 A2 | 5/2013 |
| WO | 2013155266 A1 | 10/2013 |
| WO | 2015073969 A1 | 5/2015 |

OTHER PUBLICATIONS

U.S. Appl. No. 15/923,434, filed Mar. 16, 2018.
"Line Transmission of Non-Telephone Signals, Video Codec for Audiovisual Services At p x 64 kbits," ITU-T Recommendation H.261, ITU-T Telecommunication Standardization Sector of ITU, Total 29 pages, International Telecommunication Union, Geneva, Switzerland (Mar. 1993).
"Series H: Audiovisual and Multimedia Systems, Infrastructure of audiovisual services—Coding of moving video, Information technology—Generic coding of moving pictures and associated audio information: Video: Frame packing arrangement signalling for 3D content," ITU-T Telecommunication Standardization Sector of ITU, H.262 Amendment 4, Total 238 pages, International Telecommunication Union, Geneva, Switzerland (Feb. 2012).
Office Action issued in Japanese Application No. 2018-511731 on May 21, 2019, 7 pages (with English translation).
Russian Office Action dated Jan. 29, 2019 in related Russian Patent Application No. 2018114921 (3 pages).
Search Report dated Jan. 29, 2019 in related Russian Patent Application No. 2018114921 (2 pages).
Huawei Technologies, "Affine transform prediction for next generation video coding," ITU-T SG16 Meeting, No. T13-SG16-C-1016, Oct. 2015, XP030100743, 11 pages.
Mathew et al., "Quad-Tree Motion Modeling With Leaf Merging," IEEE Transactions On Circuits and Systems for Video Technology, vol. 20, No. 10, Oct. 1, 2010, XP011318748, pp. 1331-1345.
Huang, et al., "Control-Point Representation and Differential Coding Affine-Motion Compensation," IEEE Transactions On Circuits and Systems for Video Technology, vol. 23, No. 10, Oct. 1, 2013, XP011528531, pp. 1651-1660.
Narroschke, et al., "Extending HEVC by an affine motion model," 2013 Picture Coding Symposium (PCS), IEEE, Dec. 8, 2013, XP032566989, pp. 321-324.
Extended European Search Report dated Jun. 18, 2018 in corresponding European Patent Application No. 16850254.0, 11 pages.
Huang, Han, et al., Affine Skip and Direct Modes for Efficient Video Coding, Visual Communications and Image Processing(VCIP), 2012 IEEE 20121231 (6 PP.).
Zhang, Na, Research On Merge Mode and Related Technologies of the Next Generation Video Coding Standard, China Academic Journal Electronic Publishing House, Jun. 2012, 201404 (67 pp.).
ITU-T H.263 Series H: Audiovisual and Multimedia Systems Infrastructure of audiovisual services—Coding of moving video, Video coding for low bit rate communication, Telecommunication Standardization Sector of ITU, Jan. 2005 (226 pp.).
ITU-T H.264 Series H: Audiovisual and Multimedia Systems Infrastructure of audiovisual services—Coding of moving video, Advanced video coding for generic audiovisual services, Telecommunication Standardization Sector of ITU, Feb. 2014 (790 pp.).
ITU-T H.265 Series H: Audiovisual and Multimedia Systems Infrastructure of audiovisual services—Coding of moving video, High efficiency video coding, Telecommunication Standardization Sector of Itu, Apr. 2015 (634 pp.).
Search Report, dated Jan. 22, 2018, in Chinese Application No. 201510632589.1 (6 pp.).
International Search Report, dated Nov. 28, 2016, in International Application No. PCT/CN2016/098464 (5 pp.).
Written Opinion of the International Searching Authority, dated Nov. 28, 2016, in International Application No. PCT/CN2016/098464 (7 pp.).
International Search Reporting dated Nov. 28, 2016 in corresponding International Patent Application No. PCT/CN2016/098464.
Heithausen C, Vorwerk J H., "Motion Compensation with Higher Order Motion Models for HEVC," In 2015 IEEE International Conference on Acoustics, Speech and Signal Processing (ICASSP), Apr. 19, 2015, (pp. 1438-1442), IEEE (Year: 2015).
Wien, Mathias, "High efficiency video coding," Coding Tools and specification, Signals and Communication Technology; Springer, ISSN 1860-4862, ISSN 1860-4870 (electronic), ISBN 978-3-662-44275-3, ISBN 978-3-662-44276-0 (eBook), DOI 10.1007/978-3-662-44276-0 (Year: 2015).
Konstantopoulos, C., 2015, "A Parallel Algorithm for Motion Estimation in Video Coding Using the Bilinear Transformation," SpringerPlus, 4(1), pp. 1-20. (Year: 2015).

* cited by examiner

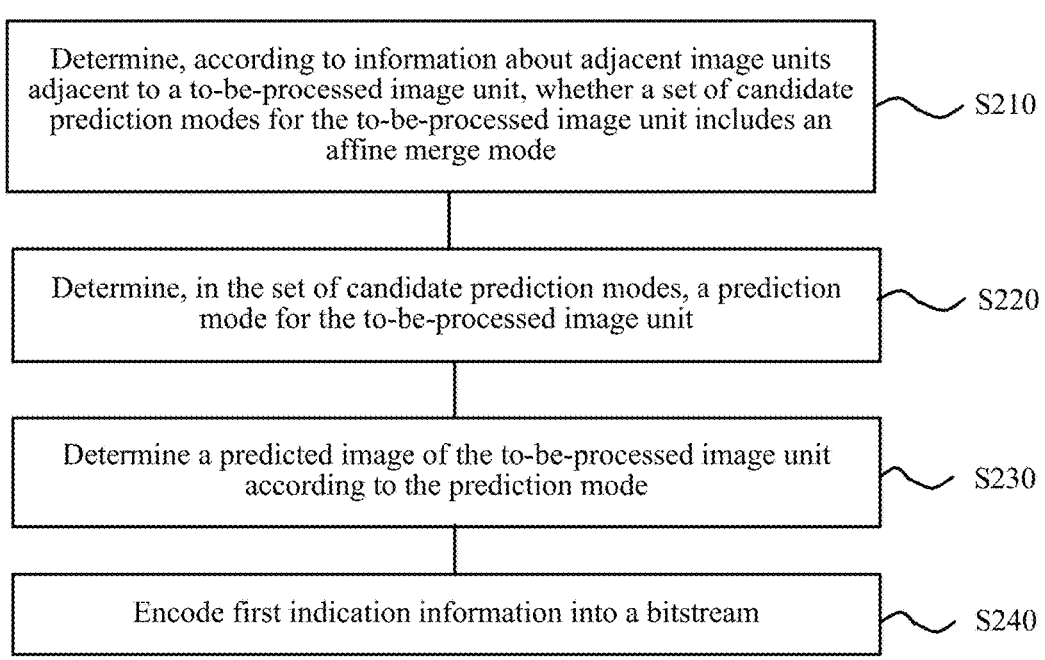

<u>200</u>

Determine, according to information about adjacent image units adjacent to a to-be-processed image unit, whether a set of candidate prediction modes for the to-be-processed image unit includes an affine merge mode — S210

Determine, in the set of candidate prediction modes, a prediction mode for the to-be-processed image unit — S220

Determine a predicted image of the to-be-processed image unit according to the prediction mode — S230

Encode first indication information into a bitstream — S240

FIG. 3

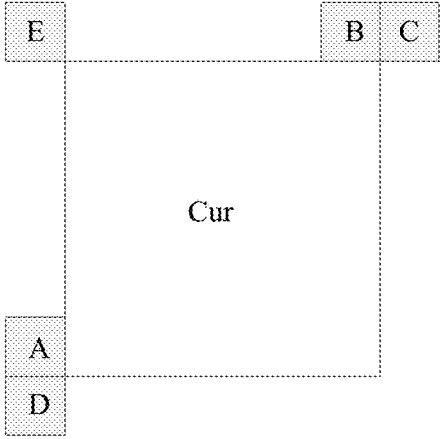

FIG. 4

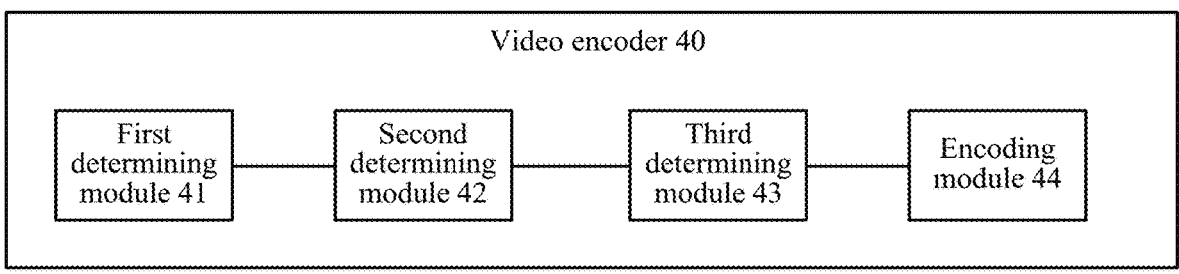

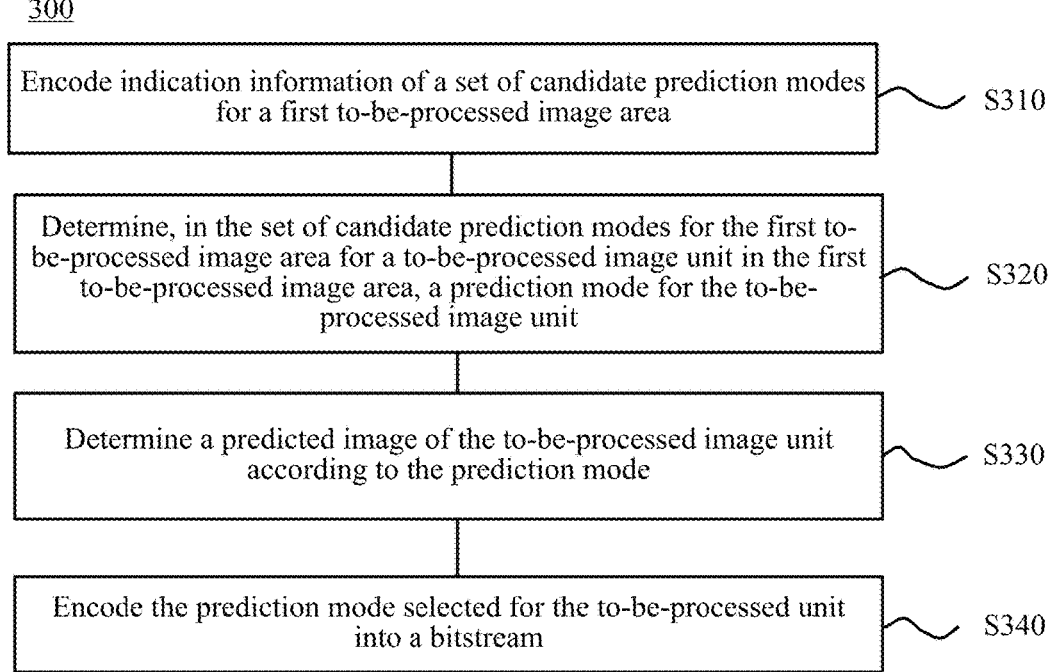

| Encode indication information of a set of candidate prediction modes for a first to-be-processed image area | S310 |

| Determine, in the set of candidate prediction modes for the first to-be-processed image area for a to-be-processed image unit in the first to-be-processed image area, a prediction mode for the to-be-processed image unit | S320 |

| Determine a predicted image of the to-be-processed image unit according to the prediction mode | S330 |

| Encode the prediction mode selected for the to-be-processed unit into a bitstream | S340 |

FIG. 6

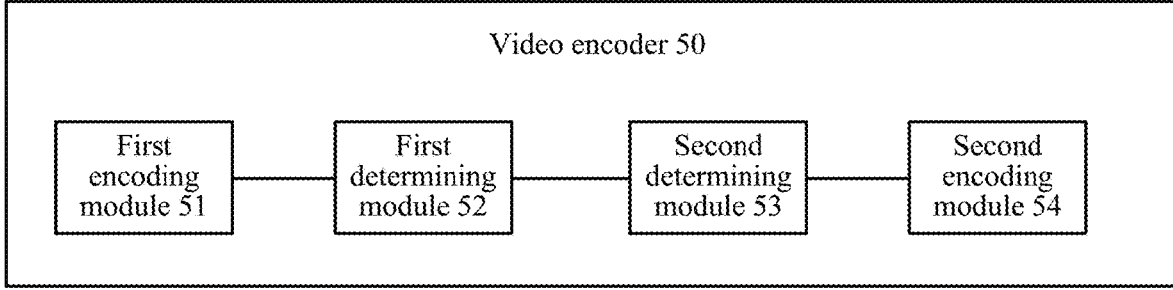

Video encoder 50

| First encoding module 51 | First determining module 52 | Second determining module 53 | Second encoding module 54 |

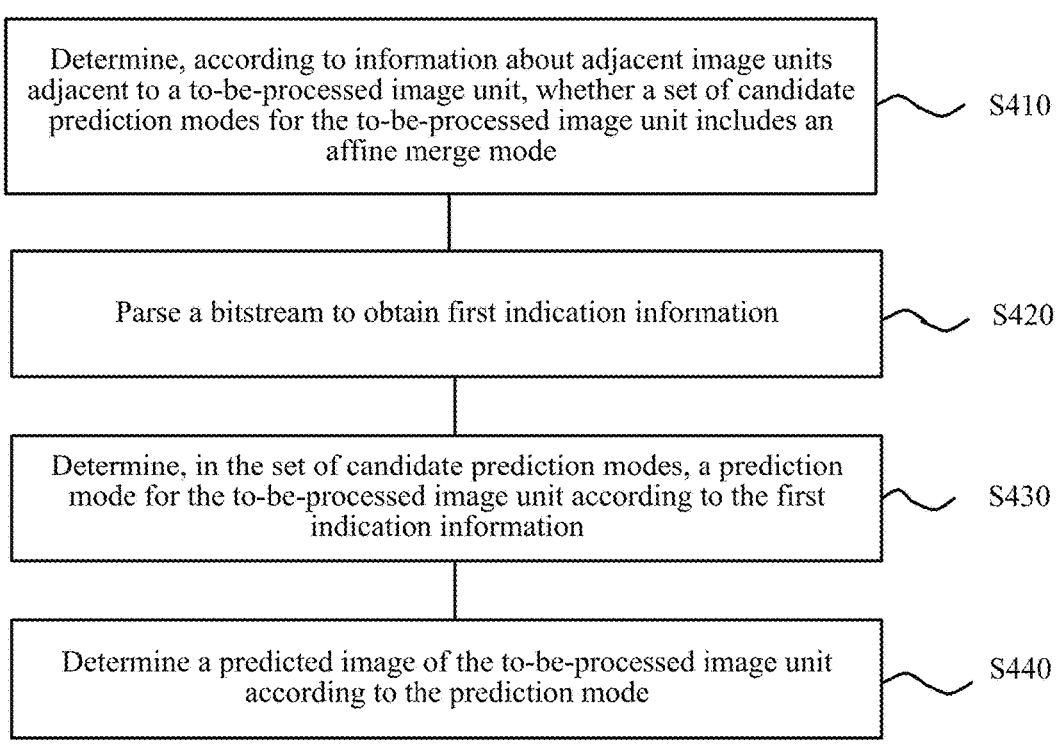

Determine, according to information about adjacent image units adjacent to a to-be-processed image unit, whether a set of candidate prediction modes for the to-be-processed image unit includes an affine merge mode — S410

Parse a bitstream to obtain first indication information — S420

Determine, in the set of candidate prediction modes, a prediction mode for the to-be-processed image unit according to the first indication information — S430

Determine a predicted image of the to-be-processed image unit according to the prediction mode — S440

FIG. 9

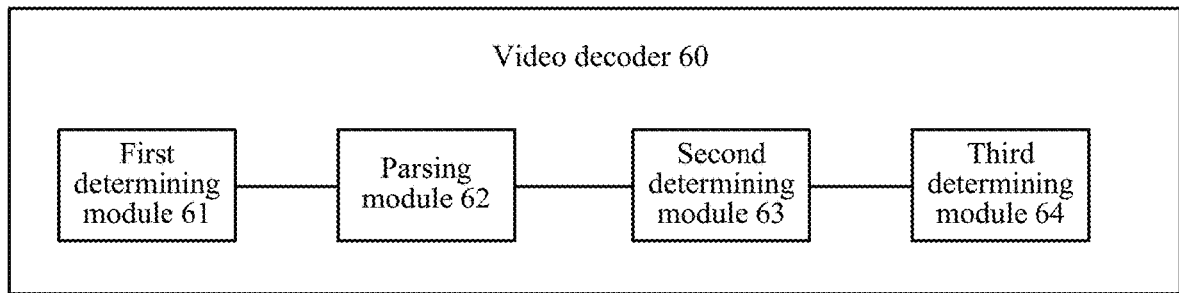

Video decoder 60

First determining module 61 — Parsing module 62 — Second determining module 63 — Third determining module 64

FIG. 10

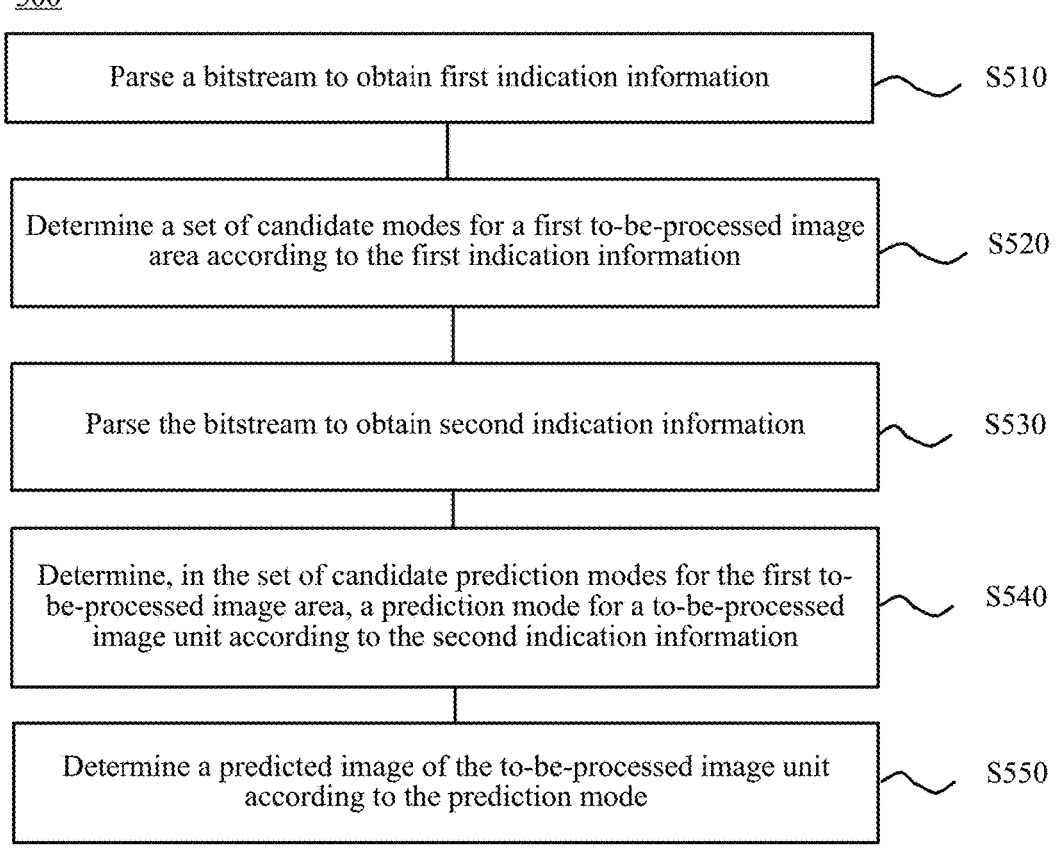

500

| Parse a bitstream to obtain first indication information | S510 |

| Determine a set of candidate modes for a first to-be-processed image area according to the first indication information | S520 |

| Parse the bitstream to obtain second indication information | S530 |

| Determine, in the set of candidate prediction modes for the first to-be-processed image area, a prediction mode for a to-be-processed image unit according to the second indication information | S540 |

| Determine a predicted image of the to-be-processed image unit according to the prediction mode | S550 |

FIG. 11

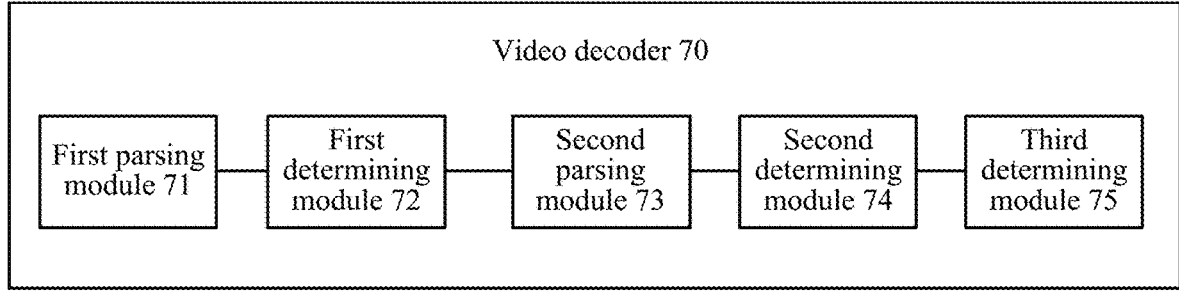

Video decoder 70

| First parsing module 71 | First determining module 72 | Second parsing module 73 | Second determining module 74 | Third determining module 75 |

FIG. 12

IMAGE PREDICTION METHOD AND APPARATUS

CROSS-REFERENCE TO RELATED APPLICATIONS

This application is a continuation of U.S. patent application Ser. No. 17/540,928, filed on Dec. 2, 2021, which is a continuation of U.S. application Ser. No. 15/923,434, filed on Mar. 16, 2018, now U.S. Pat. No. 11,323,736, which is a continuation application of an International Application No. PCT/CN2016/098464, filed on Sep. 8, 2016, which claims priority to Chinese Patent Application No. 201510632589.1, filed on Sep. 29, 2015. All of the aforementioned patent applications are hereby incorporated by reference in their entireties.

TECHNICAL FIELD

The present disclosure relates to the field of video coding and compression, and in particular, to an image prediction method and apparatus.

BACKGROUND

Digital video capabilities can be incorporated into a wide range of apparatuses, including digital televisions, digital direct broadcast systems, wireless broadcast systems, personal digital assistants (PDAs), laptop or desktop computers, tablet computers, electronic book readers, digital cameras, digital recording apparatuses, digital media players, video gaming apparatuses, video game consoles, cellular or satellite radio telephones, video conferencing apparatuses, video streaming apparatuses, and the like. Digital video apparatuses implement video compression technologies, such as video compression technologies described in standards defined by MPEG-2, MPEG-4, ITU-T H.263, ITU-T H.264/MPEG-4, Part 10: the Advanced Video Coding (AVC) standard, and ITU-T H.265: the High Efficiency Video Coding (HEVC) standard, and described in extensions of such standards, to transmit and receive digital video information more efficiently. By implementing such video coding technologies, a video apparatus can transmit, receive, encode, decode, and/or store digital video information more efficiently.

Video compression technologies include spatial (intra-picture) prediction and/or temporal (inter-picture) prediction, to reduce or remove redundancy inherent in video sequences. For block-based video coding, a video slice (that is, a video frame or a part of a video frame) may be partitioned into several video blocks. The video block may also be referred to as a tree block, a coding unit (CU), and/or a coding node. Video blocks in an intra-coded (I) slice of a picture are encoded by means of spatial prediction with respect to a reference sample in adjacent blocks in the same picture. Video blocks in an inter-coded (P or B) slice of a picture may use spatial prediction with respect to a reference sample in adjacent blocks in the same picture, or temporal prediction with respect to a reference sample in another reference picture. A picture may be referred to as a frame, and a reference picture may be referred to as a reference frame.

Spatial or temporal prediction results in a predictive block for a to-be-coded block. Residual data indicates a pixel difference between the original to-be-coded block and the predictive block. An inter-coded block is encoded according to a motion vector that points to a block of reference samples forming the predictive block, and the residual data indicating the difference between the to-be-coded block and the predictive block. An intra-coded block is encoded according to an intra-coding mode and the residual data. For further compression, the residual data may be transformed from a pixel domain to a transform domain, thereby generating residual transform coefficients. The residual transform coefficients then may be quantized. The quantized transform coefficients that are initially arranged in a two-dimensional array may be sequentially scanned to generate a one-dimensional vector of the transform coefficients, and entropy coding may be applied to achieve even more compression.

SUMMARY

The present application describes an image prediction method with improved encoding efficiency. According to prediction information or unit sizes of adjacent image units of a to-be-processed image unit or a set of candidate prediction modes marking an area level, a prediction mode for the to-be-processed image unit is derived. Because prior information is provided for encoding of the prediction mode, a bit rate of encoding the prediction mode is reduced, thereby improving encoding efficiency.

According to the technology of the present application, a method for decoding a predicted image includes: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parsing a bitstream to obtain first indication information; determining, in the set of candidate prediction modes, a prediction mode for the to-be-processed image unit according to the first indication information; and determining a predicted image of the to-be-processed image unit according to the prediction mode.

The adjacent image units of the to-be-processed image unit include at least adjacent image units on the top, left, top right, bottom left, and top left of the to-be-processed image unit.

According to the technology of the present application, the determining, according to information about adjacent image units adjacent to a to-be-processed image unit, whether a set of candidate prediction modes for the to-be-processed image unit includes an affine merge mode includes the following implementations:

A first implementation includes: when a prediction mode for at least one of the adjacent image units is obtaining a predicted image by using an affine model, parsing the bitstream to obtain second indication information, where when the second indication information is 1, the set of candidate prediction modes includes the affine merge mode; or when the second indication information is 0, the set of candidate prediction modes does not include the affine merge mode; otherwise, the set of candidate prediction modes does not include the affine merge mode.

A second implementation includes: when a prediction mode for at least one of the adjacent image units is obtaining a predicted image by using an affine model, the set of candidate prediction modes includes the affine merge mode; otherwise, the set of candidate prediction modes does not include the affine merge mode.

A third implementation includes: the information of the adjacent image units is prediction modes of the adjacent image units, the prediction modes include at least a first affine mode that a predicted image is obtained by using a first affine model or a second affine mode that a predicted image is obtained by using a second affine model, and correspondingly, the affine merge mode includes at least a first affine merge mode that merges the first affine mode or a second affine merge mode that merges the second affine mode; and correspondingly, the determining, according to information about adjacent image units adjacent to a to-be-processed image unit, whether a set of candidate prediction modes for the to-be-processed image unit includes an affine merge mode includes: when the first affine mode ranks first in quantity among the prediction modes for the adjacent prediction units, the set of candidate prediction modes includes the first affine merge mode and does not include the second affine merge mode; when the second affine mode ranks first in quantity among the prediction modes for the adjacent prediction units, the set of candidate prediction modes includes the second affine merge mode and does not include the first affine merge mode; or when a non-affine mode ranks first in quantity among the prediction modes for the adjacent prediction units, the set of candidate prediction modes does not include the affine merge mode.

The third implementation further includes: when the first affine mode ranks first in quantity among the prediction modes for the adjacent prediction units, the set of candidate prediction modes includes the first affine merge mode and does not include the second affine merge mode; when the second affine mode ranks first in quantity among the prediction modes for the adjacent prediction units, the set of candidate prediction modes includes the second affine merge mode and does not include the first affine merge mode; when a non-affine mode ranks first in quantity and the first affine mode ranks second in quantity among the prediction modes for the adjacent prediction units, the set of candidate prediction modes includes the first affine merge mode and does not include the second affine merge mode; or when a non-affine mode ranks first in quantity and the second affine mode ranks second in quantity among the prediction modes for the adjacent prediction units, the set of candidate prediction modes includes the second affine merge mode and does not include the first affine merge mode.

A fourth implementation includes: when a prediction mode for at least one of the adjacent image units is obtaining a predicted image by using an affine model, and a width and a height of the at least one of the adjacent image units are respectively less than a width and a height of the to-be-processed image unit, parsing the bitstream to obtain third indication information, where when the third indication information is 1, the set of candidate prediction modes includes the affine merge mode, or when the third indication information is 0, the set of candidate prediction modes does not include the affine merge mode; otherwise, the set of candidate prediction modes does not include the affine merge mode.

A fifth implementation includes: when a prediction mode for at least one of the adjacent image units is obtaining a predicted image by using an affine model, and a width and a height of the at least one of the adjacent image units are respectively less than a width and a height of the to-be-processed image unit, the set of candidate prediction modes includes the affine merge mode; otherwise, the set of candidate prediction modes does not include the affine merge mode.

According to the technology of the present application, a method for decoding a predicted image includes: parsing a bitstream to obtain first indication information; determining a set of candidate modes for a first to-be-processed image area according to the first indication information, where when the first indication information is 0, a set of candidate translational modes is used as the set of candidate modes for the first to-be-processed image area, where the translational mode indicates a prediction mode that a predicted image is obtained by using a translational model; or when the first indication information is 1, a set of candidate translational modes and a set of candidate affine modes are used as the set of candidate modes for the first to-be-processed image area, where the affine mode indicates a prediction mode that a predicted image is obtained by using an affine model; parsing the bitstream to obtain second indication information; determining, in a set of candidate prediction modes for the first to-be-processed image area, a prediction mode for a to-be-processed image unit according to the second indication information, where the to-be-processed image unit belongs to the first to-be-processed image area; and determining a predicted image of the to-be-processed image unit according to the prediction mode.

The first to-be-processed image area includes one of an image frame group, an image frame, an image tile set, an image slice set, an image tile, an image slice, an image encoding unit set, or an image encoding unit.

In an example, a method for decoding a predicted image includes: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parsing a bitstream to obtain first indication information; determining, in the set of candidate prediction modes, a prediction mode for the to-be-processed image unit according to the first indication information; and determining a predicted image of the to-be-processed image unit according to the prediction mode.

In another example, a method for encoding a predicted image includes: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; determining, in the set of candidate prediction modes, a prediction mode for the to-be-processed image unit; determining a predicted image of the to-be-processed image unit according to the prediction mode; and encoding first indication information into a bitstream, where the first indication information indicates the prediction mode.

In another example, a method for decoding a predicted image includes: parsing a bitstream to obtain first indication information; determining a set of candidate modes for a first to-be-processed image area according to the first indication information, where when the first indication information is 0, a set of candidate translational modes is used as the set of candidate modes for the first to-be-processed image area, where the translational mode indicates a prediction mode that a predicted image is obtained by using a translational model; or when the first indication information is 1, a set of candidate translational modes and a set of candidate affine modes are used as the set of candidate modes for the first to-be-processed image area, where the affine mode indicates a prediction mode that a predicted image is obtained by using an affine model; parsing the bitstream to obtain second indication information; determining, in a set of candidate prediction modes for the first to-be-processed image area, a prediction mode for a to-be-processed image unit according to the second indication information, where the to-be-processed image unit belongs to the first to-be-processed image area; and determining a predicted image of the to-be-processed image unit according to the prediction mode.

In another example, a method for encoding a predicted image includes: when a set of candidate translational modes is used as a set of candidate modes for a first to-be-processed image area, setting first indication information to 0 and encoding the first indication information into a bitstream, where the translational mode indicates a prediction mode that a predicted image is obtained by using a translational model; or when a set of candidate translational modes and a set of candidate affine modes are used as a set of candidate modes for a first to-be-processed image area, setting first indication information to 1 and encoding the first indication information into a bitstream, where the affine mode indicates a prediction mode that a predicted image is obtained by using an affine model; determining, in a set of candidate prediction modes for the first to-be-processed image area, a prediction mode for a to-be-processed image unit, where the to-be-processed image unit belongs to the first to-be-processed image area; determining a predicted image of the to-be-processed image unit according to the prediction mode; and encoding second indication information into the bitstream, where the second indication information indicates the prediction mode.

In another example, an apparatus for decoding a predicted image includes: a first determining module, configured to determine, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; a parsing module, configured to parse a bitstream to obtain first indication information; a second determining module, configured to determine, in the set of candidate prediction modes, a prediction mode for the to-be-processed image unit according to the first indication information; and a third determining module, configured to determine a predicted image of the to-be-processed image unit according to the prediction mode.

In another example, an apparatus for encoding a predicted image includes: a first determining module, configured to determine, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; a second determining module, configured to determine, in the set of candidate prediction modes, a prediction mode for the to-be-processed image unit; a third determining module, configured to determine a predicted image of the to-be-processed image unit according to the prediction mode; and an encoding module, configured to encode first indication information into a bitstream, where the first indication information indicates the prediction mode.

In another example, an apparatus for decoding a predicted image includes: a first parsing module, configured to parse a bitstream to obtain first indication information; a first determining module, configured to determine a set of candidate modes for a first to-be-processed image area according to the first indication information, where when the first indication information is 0, a set of candidate translational modes is used as the set of candidate modes for the first to-be-processed image area, where the translational mode indicates a prediction mode that a predicted image is obtained by using a translational model; or when the first indication information is 1, a set of candidate translational modes and a set of candidate affine modes are used as the set of candidate modes for the first to-be-processed image area, where the affine mode indicates a prediction mode that a predicted image is obtained by using an affine model; a second parsing module, configured to parse the bitstream to obtain second indication information; a second determining module, configured to determine, in a set of candidate prediction modes for the first to-be-processed image area, a prediction mode for a to-be-processed image unit according to the second indication information, where the to-be-processed image unit belongs to the first to-be-processed image area; and a third determining module, configured to determine a predicted image of the to-be-processed image unit according to the prediction mode.

In another example, an apparatus for encoding a predicted image includes: a first encoding module, configured to: when a set of candidate translational modes is used as a set of candidate modes for a first to-be-processed image area, set first indication information to 0 and encode the first indication information into a bitstream, where the translational mode indicates a prediction mode that a predicted image is obtained by using a translational model; or when a set of candidate translational modes and a set of candidate affine modes are used as a set of candidate modes for a first to-be-processed image area, set first indication information to 1 and encode the first indication information into a bitstream, where the affine mode indicates a prediction mode that a predicted image is obtained by using an affine model; a first determining module, configured to determine, in a set of candidate prediction modes for the first to-be-processed image area, a prediction mode for a to-be-processed image unit, where the to-be-processed image unit belongs to the first to-be-processed image area; a second determining module, configured to determine a predicted image of the to-be-processed image unit according to the prediction mode; and a second encoding module, configured to encode second indication information into the bitstream, where the second indication information indicates the prediction mode.

In another example, a device for decoding video data is provided. The device includes a video decoder that is configured to perform the following operations: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parsing a bitstream to obtain first indication information; determining, in the set of candidate prediction modes, a prediction mode for the to-be-processed image unit according to the first indication information; and determining a predicted image of the to-be-processed image unit according to the prediction mode.

In another example, a device for encoding video data is provided. The device includes a video encoder that is configured to perform the following operations: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; determining, in the set of candidate prediction modes, a prediction mode for the to-be-processed image unit; determining a predicted image of the to-be-processed image unit according to the prediction mode; and encoding first indication information into a bitstream, where the first indication information indicates the prediction mode.

In another example, a device for decoding video data is provided. The device includes a video decoder that is configured to perform the following operations: parsing a bitstream to obtain first indication information; determining a set of candidate modes for a first to-be-processed image area according to the first indication information, where when the first indication information is 0, a set of candidate translational modes is used as the set of candidate modes for the first to-be-processed image area, where the translational mode indicates a prediction mode that a predicted image is obtained by using a translational model; or when the first indication information is 1, a set of candidate translational modes and a set of candidate affine modes are used as the set of candidate modes for the first to-be-processed image area, where the affine mode indicates a prediction mode that a predicted image is obtained by using an affine model; parsing the bitstream to obtain second indication information; determining, in a set of candidate prediction modes for the first to-be-processed image area, a prediction mode for a to-be-processed image unit according to the second indication information, where the to-be-processed image unit belongs to the first to-be-processed image area; and determining a predicted image of the to-be-processed image unit according to the prediction mode.

In another example, a device for encoding video data is provided. The device includes a video encoder that is configured to perform the following operations: when a set of candidate translational modes is used as a set of candidate modes for a first to-be-processed image area, setting first indication information to 0 and encoding the first indication information into a bitstream, where the translational mode indicates a prediction mode that a predicted image is obtained by using a translational model; or when a set of candidate translational modes and a set of candidate affine modes are used as a set of candidate modes for a first to-be-processed image area, setting first indication information to 1 and encoding the first indication information into a bitstream, where the affine mode indicates a prediction mode that a predicted image is obtained by using an affine model; determining, in a set of candidate prediction modes for the first to-be-processed image area, a prediction mode for a to-be-processed image unit, where the to-be-processed image unit belongs to the first to-be-processed image area; determining a predicted image of the to-be-processed image unit according to the prediction mode; and encoding second indication information into the bitstream, where the second indication information indicates the prediction mode.

In another example, a computer-readable storage medium that stores an instruction is provided. When being executed, the instruction causes one or more processors of a device for decoding video data to perform the following operations: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parsing a bitstream to obtain first indication information; determining, in the set of candidate prediction modes, a prediction mode for the to-be-processed image unit according to the first indication information; and determining a predicted image of the to-be-processed image unit according to the prediction mode.

In another example, a computer-readable storage medium that stores an instruction is provided. When being executed, the instruction causes one or more processors of a device for encoding video data to perform the following operations: determining, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; determining, in the set of candidate prediction modes, a prediction mode for the to-be-processed image unit; determining a predicted image of the to-be-processed image unit according to the prediction mode; and encoding first indication information into a bitstream, where the first indication information indicates the prediction mode.

In another example, a computer-readable storage medium that stores an instruction is provided. When being executed, the instruction causes one or more processors of a device for decoding video data to perform the following operations: parsing a bitstream to obtain first indication information; determining a set of candidate modes for a first to-be-processed image area according to the first indication information, where when the first indication information is 0, a set of candidate translational modes is used as the set of candidate modes for the first to-be-processed image area, where the translational mode indicates a prediction mode that a predicted image is obtained by using a translational model; or when the first indication information is 1, a set of candidate translational modes and a set of candidate affine modes are used as the set of candidate modes for the first to-be-processed image area, where the affine mode indicates a prediction mode that a predicted image is obtained by using an affine model; parsing the bitstream to obtain second indication information; determining, in a set of candidate prediction modes for the first to-be-processed image area, a prediction mode for a to-be-processed image unit according to the second indication information, where the to-be-processed image unit belongs to the first to-be-processed image area; and determining a predicted image of the to-be-processed image unit according to the prediction mode.

In another example, a computer-readable storage medium that stores an instruction is provided. When being executed, the instruction causes one or more processors of a device for encoding video data to perform the following operations: when a set of candidate translational modes is used as a set of candidate modes for a first to-be-processed image area, setting first indication information to 0 and encoding the first indication information into a bitstream, where the translational mode indicates a prediction mode that a predicted image is obtained by using a translational model; or when a set of candidate translational modes and a set of candidate affine modes are used as a set of candidate modes for a first to-be-processed image area, setting first indication information to 1 and encoding the first indication information into a bitstream, where the affine mode indicates a prediction mode that a predicted image is obtained by using an affine model; determining, in a set of candidate prediction modes for the first to-be-processed image area, a prediction mode for a to-be-processed image unit, where the to-be-processed image unit belongs to the first to-be-processed image area; determining a predicted image of the to-be-processed image unit according to the prediction mode; and encoding second indication information into the bitstream, where the second indication information indicates the prediction mode.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 3 is a schematic flowchart illustrating an example operation of a video encoder according to an embodiment of the present application;

FIG. 4 is a schematic diagram of positions of a to-be-processed block and reconstructed blocks adjacent to the to-be-processed block according to an embodiment of the present application;

FIG. 5 is a schematic block diagram of another video encoder according to an embodiment of the present application;

FIG. 6 is a schematic flowchart illustrating another example operation of a video encoder according to an embodiment of the present application;

FIG. 7 is a schematic block diagram of still another video encoder according to an embodiment of the present application;

FIG. 9 is a schematic flowchart illustrating an example operation of a video decoder according to an embodiment of the present application;

FIG. 10 is a schematic block diagram of another video decoder according to an embodiment of the present application;

FIG. 11 is a schematic flowchart illustrating another example operation of a video decoder according to an embodiment of the present application; and FIG. 12 is a schematic block diagram of still another video decoder according to an embodiment of the present application.

DESCRIPTION OF EMBODIMENTS

Figure 1:
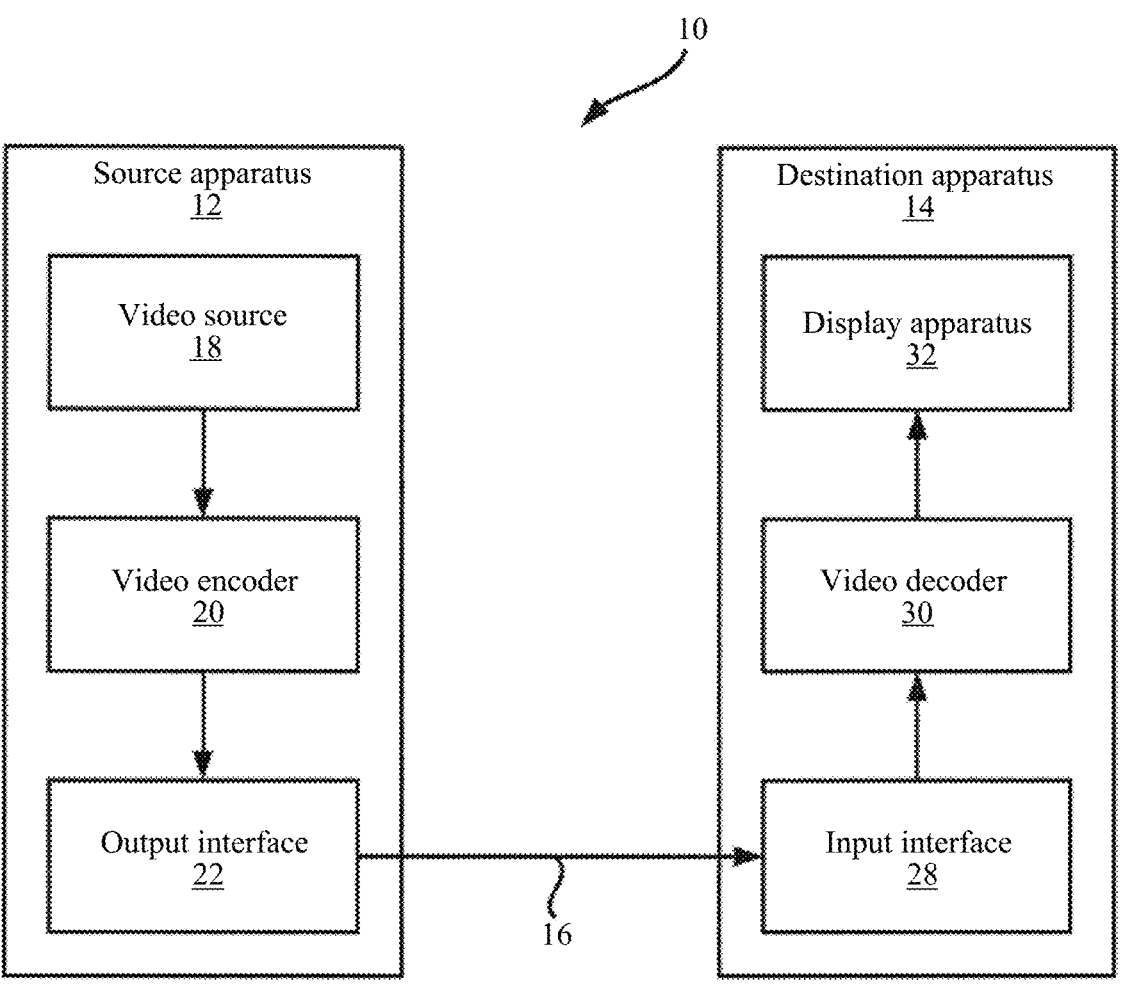
FIG. 1 is a schematic block diagram of a video coding system according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Motion compensation is one of key technologies in video encoding for improving compression efficiency. Conventional motion compensation based on block matching is a method widely applied to mainstream video encoders, and especially, in video encoding standards. In the motion compensation method based on block matching, an inter-predicted block uses a translational motion model, and the translational motion model assumes that motion vectors in all pixel positions of a block are equal. However, this assumption is invalid in many cases. Actually, a motion of an object in a video is usually a complex combination of motions such as translation, rotation, and zoom. If a pixel block includes these complex motions, a predicted signal that is obtained by using the conventional motion compensation method based on block matching is inaccurate. Consequently, inter-frame correlation cannot be completely removed. To resolve the problem, a high-order motion model is introduced to the motion compensation in the video encoding. The high-order motion model has greater freedom than the translational motion model, and allows pixels in an inter-predicted block to have different motion vectors. That is, a motion vector field generated by means of the high-order motion model is more accurate.

An affine motion model described based on a control point is a representative type of high-order motion model. Different from the conventional translational motion model, a value of a motion vector of each pixel point in a block is related to a position of the pixel point, and is a first-order linear equation of a coordinate position. The affine motion model allows a warp transform such as rotation or zoom of a reference block, and a more accurate predicted block can be obtained by means of the motion compensation.

The foregoing inter-prediction type that a predicted block is obtained by using the affine motion model by means of the motion compensation is generally referred to as an affine mode. In current mainstream video compression encoding standards, the inter-prediction type includes two modes: an advanced motion vector prediction (AMVP) mode and a merge mode. In AMVP, for each encoding block, a prediction direction, a reference frame index, and a difference between an actual motion vector and a predicted motion vector need to be explicitly transferred. However, in the merge mode, motion information of a current encoding block is directly derived from a motion vector of an adjacent block. The affine mode and the inter-prediction manner such as AMVP or Merge that is based on the translational motion model may be combined to form a new inter-prediction mode such as AMVP or Merge that is based on the affine motion model. For example, a merge mode based on the affine motion model may be referred to as an affine merge mode. In a process of selecting a prediction mode, new prediction modes and prediction modes in current standards participate in a "performance/cost ratio" comparison process together, to select an optimal mode as the prediction mode and generate a predicted image of a to-be-processed block. Generally, a prediction mode selection result is encoded and an encoded prediction mode selection result is transmitted to a decoding side.

The affine mode may better improve accuracy of a predicted block and improve encoding efficiency. However, on the other hand, for the affine mode, more bit rates need to be consumed to encode motion information of control points than those needed for uniform motion information based on the translational motion model. In addition, because candidate prediction modes increase, bit rates used to encode a prediction mode selection result also increase. Such additional bit rate consumption all affects improvement of the encoding efficiency.

According to the technical solutions of the present application, on one hand, whether a set of candidate prediction modes for a to-be-processed image unit includes an affine merge mode is determined according to prediction mode information or size information of adjacent image units of the to-be-processed image unit; a bitstream is parsed to obtain indication information; a prediction mode for the to-be-processed image unit is determined in the set of candidate prediction modes according to the indication information; and a predicted image of the to-be-processed image unit is determined according to the prediction mode. On the other hand, a bitstream is parsed to obtain indication information; whether a particular area uses a set of candidate prediction modes including an affine mode is determined by using the indication information; a prediction mode is determined according to the set of candidate prediction modes and other received indication information; and a predicted image is generated.

Therefore, the prediction mode information or size information of the adjacent image units of the to-be-processed image unit may be used as prior knowledge for encoding prediction information of the to-be-processed image unit. Indication information including the set of candidate prediction modes in the area may also be used as prior knowledge for encoding prediction information of the to-be-processed image unit. The prior knowledge instructs encoding of the prediction mode, reducing a bit rate of encoding mode selection information, thereby improving the encoding efficiency.

In addition, there are multiple solutions for improving efficiency in encoding motion information of an affine model, for example, patent applications No. CN201010247275.7, CN201410584175.1, CN201410526608.8, CN201510085362.X, PCT/CN2015/073969, CN201510249484.8, CN201510391765.7, and CN201510543542.8, which are incorporated herein by reference in their entireties. It should be understood that, because specific technical problems resolved are different, the technical solutions of the present application may be applied to the foregoing solutions, to further improve the encoding efficiency.

It should be further understood that, the affine model is a general term of non-translational motion models. Actual motions including rotation, zoom, deformation, perspective, and the like all may be used for motion estimation and motion compensation in inter-prediction by establishing different motion models, and are separately referred to as a first affine model, a second affine model, and the like for short.

FIG. 1 is a schematic block diagram of a video coding system 10 according to an embodiment of the present application. As described in this specification, the term "video coder" generically refers to both a video encoder and a video decoder. In the present application, the terms "video coding" or "coding" may generically refer to video encoding or video decoding.

As shown in FIG. 1, the video coding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of video coding apparatuses or video coding devices. The source apparatus 12 and the destination apparatus 14 may include a wide range of apparatuses, including desktop computers, mobile computing apparatuses, notebook (for example, laptop) computers, tablet computers, set-top boxes, telephone handsets such as so-called "smart" phones, televisions, cameras, display apparatuses, digital media players, video gaming consoles, in-vehicle computers, or the like.

The destination apparatus 14 may receive the encoded video data from the source apparatus 12 by using a channel 16. The channel 16 may include one or more media and/or apparatuses that can move the encoded video data from the source apparatus 12 to the destination apparatus 14. In an example, the channel 16 may include one or more communication media that allow the source apparatus 12 to directly transmit the encoded video data to the destination apparatus 14 in real-time. In this example, the source apparatus 12 may modulate the encoded video data according to a communication standard (for example, a wireless communication protocol), and may transmit the modulated video data to the destination apparatus 14. The one or more communication media may include wireless and/or wired communication media, for example, a radio frequency (RF) spectrum or one or more physical transmission lines. The one or more communication media may form a part of a packet-based network (for example, a local area network, a wide area network, or a global network (such as the Internet)). The one or more communication media may include a router, a switch, a base station, or another device that facilitates communication from the source apparatus 12 to the destination apparatus 14.

In another example, the channel 16 may include to a storage medium that stores the encoded video data generated by the source apparatus 12. In this example, the destination apparatus 14 may access the storage medium by means of disk access or card access. The storage medium may include a variety of locally-accessed data storage media such as a Blu-ray disc, a DVD, a CD-ROM, a flash memory, or other suitable digital storage media for storing the encoded video data.

In another example, the channel 16 may include a file server or another intermediate storage apparatus that stores the encoded video data generated by the source apparatus 12. In this example, the destination apparatus 14 may access, by means of streaming transmission or download, the encoded video data that is stored in the file server or the another intermediate storage apparatus. The file server may be a type of server that can store the encoded video data and transmit the encoded video data to the destination apparatus 14. Examples of the file server include a web server (for example, for a website), a file transfer protocol (FTP) server, a network attached storage (NAS) apparatus, and a local disk drive.

The destination apparatus 14 may access the encoded video data by means of a standard data connection (such as an Internet connection). An example type of data connection may include a wireless channel (for example, a Wi-Fi connection), a wired connection (for example, a DSL or a cable modem), or a combination of both that is suitable for accessing the encoded video data stored on the file server. The transmission of the encoded video data from the file server may be streaming transmission, download transmission, or a combination of both.

The technologies of the present application are not limited to wireless applications or settings. The technologies may be applied to video coding in support of a variety of multimedia applications in the following, for example, over-the-air television broadcasting, cable television transmission, satellite television transmission, streaming video transmission (for example, by means of the Internet), encoding of video data stored on a data storage medium, decoding of the video data stored on the data storage medium, or another application. In some examples, the video coding system 10 may be configured to support one-way or two-way video transmission, so as to support applications such as video streaming, video playback, video broadcasting, and/or video telephony.

In the example of FIG. 1, the source apparatus 12 includes a video source 18, a video encoder 20, and an output interface 22. In some examples, the output interface 22 may include a modulator/demodulator (a modem) and/or a transmitter. The video source 18 may include a video capture apparatus (such as a video camera), a video archive containing previously-captured video data, a video feed interface for receiving video data from a video content provider, and/or a computer graphics system for generating video data, or a combination of such sources of video data.

The video encoder 20 may encode video data from the video source 18. In some examples, the source apparatus 12 directly transmits the encoded video data to the destination apparatus 14 by using the output interface 22. Alternatively, the encoded video data may be stored on the storage medium or the file server for later access by the destination apparatus 14 for decoding and/or playback.

In the example of FIG. 1, the destination apparatus 14 includes an input interface 28, a video decoder 30, and a display apparatus 32. In some examples, the input interface 28 includes a receiver and/or a modem. The input interface 28 may receive the encoded video data by using the channel 16. The display apparatus 32 may be integrated with the destination apparatus 14, or may be outside the destination apparatus 14. In general, the display apparatus 32 displays decoded video data. The display apparatus 32 may include a variety of display apparatuses, for example, a liquid crystal display (LCD), a plasma display, an organic light emitting diode (OLED) display, or another type of display apparatus.

The video encoder 20 and the video decoder 30 may operate according to a video compression standard (such as the High Efficiency Video Coding (H.265) standard), and may conform to the HEVC Test Model (HM). The text description ITU-T H.265 (V3) (April 2015) of the H.265 standard is published on Apr. 29, 2015, and may be downloaded from http://handle.itu.int/11.1002/1000/12455. The entire content of the file is incorporated herein by reference.

Alternatively, the video encoder 20 and the video decoder 30 may operate according to other proprietary or industry standards. The standards include ITU-T H.261, ISO/IECMPEG-1 Visual, ITU-T H.262 or ISO/IECMPEG-2Visual, ITU-T H.263, ISO/IECMPEG-4Visual, and ITU-T H.264 (further referred to as ISO/IECMPEG-4AVC), and include Scalable Video Coding (SVC) and Multiview Video Coding (MVC) extensions thereof. However, the technologies of the present application are not limited to any particular coding standard or technology.

In addition, FIG. 1 is merely an example and the technologies of the present application may be applied to a video coding setting (for example, video encoding or video decoding) that does not necessarily include any data communication between the encoding apparatus and the decoding apparatus. In other examples, data is retrieved from a local memory, and streamed over a network or operated in a similar manner. The encoding apparatus may encode the data and store encoded data in the memory, and/or the decoding apparatus may retrieve data from the memory and decode the data. In many examples, encoding and decoding are performed by multiple apparatuses that do not communicate with one another, but simply encode data to a memory and/or retrieve the data from the memory and decode the data.

The video encoder 20 and the video decoder 30 each may be implemented as any of a variety of suitable circuits, such as one or more microprocessors, a digital signal processor (DSP), an application-specific integrated circuit (ASIC), a field-programmable gate array (FPGA), discrete logic, hardware, or any combination thereof. If the technologies are partially implemented in software, an apparatus may store an instruction for the software in a suitable non-transitory computer-readable storage medium and may execute the instruction in hardware by using one or more processors to perform the technologies of the present application. Any (including the hardware, the software, a combination of hardware and software, or the like) of the foregoing may be considered as one or more processors. Each of the video encoder 20 and the video decoder 30 may be included in one or more encoders or decoders, and either of the video encoder 20 and the video decoder 30 may be integrated as a part of a combined encoder/decoder (an encoder and decoder (CODEC)) in a respective apparatus.

The present application may generally refer to the video encoder 20 "signaling" particular information to another apparatus (such as the video decoder 30). The term "signaling" may generally refer to communication of a syntax element and/or other data that represents encoded video data. Such communication may occur in real or near real time. Alternatively, such communication may occur over a span of time, for example, might occur when a syntax element is stored in a computer-readable storage medium as an encoded bitstream during encoding. The syntax element may be then retrieved by the decoding apparatus at any time after being stored in this medium.

As mentioned briefly above, the video encoder 20 encodes video data. The video data may include one or more pictures. Each of the pictures may be a still image. In some examples, the picture may be referred to as a video "frame". The video encoder 20 may generate a bitstream, and the bitstream includes a sequence of bits that form a coded representation of the video data. The coded representation of the video data may include a coded picture and associated data. The coded picture is a coded representation of a picture. The associated data may include a sequence parameter set (SPS), a picture parameter set (PPS), and another syntax structure. The SPS may include parameters applicable to zero or more sequences of pictures. The PPS may include parameters applicable to zero or more pictures. The syntax structure may be a set of zero or more syntax elements presented together in a bitstream in a specified order.

To generate an encoded representation of a picture, the video encoder 20 may partition the picture into a grid of coding tree blocks (CTBs). In some examples, the CTB may be referred to as a "tree block", a "largest coding unit" (LCU), or a "coding tree unit." A CTB of HEVC may be broadly analogous to a macroblock in the previous standard (such as H.264/AVC). However, a CTB is not necessarily limited to a particular size and may include one or more coding units (CUs).

Each of the CTBs may be associated with a different equally-sized block of pixels within the picture. Each pixel may include a luminance (luminance or luma) sample and two chrominance (chrominance or chroma) samples. Therefore, each CTB may be associated with a block of luminance samples and two blocks of chrominance samples. For case of explanation, in the present application, a two-dimensional pixel array may be referred to as a pixel block and a two-dimensional sample array may be referred to as a sample block. The video encoder 20 may partition, by means of quad-tree partitioning, a pixel block associated with a CTB into pixel blocks associated with a CU, which are therefore named as "coding tree blocks."

CTBs of a picture may be grouped into one or more slices. In some examples, each of the slices includes an integer number of CTBs. As a part of picture encoding, the video encoder 20 may generate an encoded representation (that is, a coded slice) of each slice of the picture. To generate a coded slice, the video encoder 20 may encode each CTB of the slice to generate an encoded representation (that is, a coded CTB) of each of the CTBs of the slice.

To generate a coded CTB, the video encoder 20 may recursively perform quad-tree partitioning on a pixel block associated with a CTB to partition the pixel block into progressively-smaller pixel blocks. Each of the smaller pixel blocks may be associated with a CU. A partitioned CU may be a CU whose pixel block is partitioned into pixel blocks associated with another CU. A non-partitioned CU may be a CU whose pixel block is not partitioned into pixel blocks associated with another CU.

The video encoder 20 may generate one or more prediction units (PUs) for each non-partitioned CU. Each of the PUs of the CU may be associated with a different pixel block in pixel blocks of the CU. The video encoder 20 may generate a predictive pixel block for each PU of the CU. The predictive pixel block of the PU may be a pixel block.

The video encoder 20 may generate a predictive pixel block for a PU by means of intra-prediction or inter-prediction. If the video encoder 20 generates a predictive pixel block of a PU by means of intra-prediction, the video encoder 20 may generate the predictive pixel block of the PU based on decoded pixels of a picture associated with the PU. If the video encoder 20 generates a predictive pixel block of a PU by means of inter-prediction, the video encoder 20 may generate the predictive pixel block of the PU based on decoded pixels of one or more pictures other than a picture associated with the PU.

The video encoder 20 may generate a residual pixel block for a CU based on predictive pixel blocks of PUs of the CU. The residual pixel block of the CU may indicate differences between samples in the predictive pixel blocks of the PUs of the CU and corresponding samples in an original pixel block of the CU.

In addition, as a part of encoding a non-partitioned CU, the video encoder 20 may perform recursive quad-tree partitioning on a residual pixel block of the CU to partition the residual pixel block of the CU into one or more smaller residual pixel blocks associated with transform units (TUs) of the CU. Because pixels in pixel blocks associated with the TUs each include a luminance sample and two chrominance samples, each of the TUs may be associated with a residual sample block of the luminance sample and two residual sample blocks of the chrominance samples.

The video encoder 20 may apply one or more transforms to the residual sample blocks associated with the TUs to generate coefficient blocks (that is, blocks of coefficients). The video encoder 20 may perform a quantization process on each of the coefficient blocks. Quantization generally refers to a process in which coefficients are quantized to possibly reduce an amount of data used to represent the coefficients, thereby performing further compression.

The video encoder 20 may generate a set of syntax elements that represent the coefficients in the quantized coefficient blocks. The video encoder 20 may apply an entropy encoding operation (such as a context-adaptive binary arithmetic coding (CABAC) operation) to at least some of these syntax elements.

To apply CABAC encoding to a syntax element, the video encoder 20 may binarize the syntax element to form a binary string including a series of one or more bits (which are referred to as "bins"). The video encoder 20 may encode some of the bins by means of regular CABAC encoding and may encode other ones of the bins by means of bypass encoding.

When the video encoder 20 encodes a sequence of bins by means of regular CABAC encoding, the video encoder 20 may first identify a coding context. The coding context may identify probabilities of coding bins having particular values. For example, a coding context may indicate that a probability of coding a 0-valued bin is 0.7 and a probability of coding a 1-valued bin is 0.3. After identifying the coding context, the video encoder 20 may divide an interval into a lower sub-interval and an upper sub-interval. One of the sub-intervals may be associated with a value 0 and the other sub-interval may be associated with a value 1. A width of the sub-interval may be proportional to a probability indicated for the associated value by the identified coding context.

If a bin of a syntax element has a value associated with a lower sub-interval, an encoded value may be equal to a lower boundary of the lower sub-interval. If the same bin of the syntax element has a value associated with an upper sub-interval, the encoded value may be equal to a lower boundary of the upper sub-interval. To encode a next bin of the syntax element, the video encoder 20 may repeat these steps with respect to an interval within which the sub-interval associated with the value of the encoded bit falls. When the video encoder 20 repeats these steps for the next bin, the video encoder 20 may use a probability that is modified based on the probability indicated by the identified coding context and an actual value of the encoded bin.

When the video encoder 20 encodes a sequence of bins by means of bypass encoding, the video encoder 20 may be able to code several bins in a single cycle, but when the video encoder 20 encodes a sequence of bins by means of regular CABAC encoding, the video encoder 20 may be able to code only a single bin in a cycle. The bypass coding may be simpler because in the bypass coding, the video encoder 20 does not need to select a context and the video encoder 20 can assume that probabilities for both symbols (0 and 1) are ½ (50%). Therefore, in the bypass coding, the interval is directly split in half. Actually, the bypass coding bypasses a context adaptive part of an arithmetic coding engine.

Performing bypass coding on a bin requires less computation than performing regular CABAC coding on the bin. In addition, performing bypass coding may allow for a higher degree of parallelization and a higher throughput. Bins encoded by means of bypass coding may be referred to as "bypass-coded bins."

In addition to performing entropy encoding on syntax elements in a coefficient block, the video encoder 20 may apply inverse quantization and an inverse transform to a transform block, so as to reconstruct a residual sample block from the transform block. The video encoder 20 may add the reconstructed residual sample block to a corresponding sample from one or more predictive sample blocks to generate a reconstructed sample block. By reconstructing a sample block for each color component, the video encoder 20 may reconstruct a pixel block associated with a TU. By reconstructing pixel blocks for each TU of a CU in this way, the video encoder 20 may reconstruct the pixel blocks of the CU.

After the video encoder 20 reconstructs the pixel blocks of the CU, the video encoder 20 may perform a deblocking operation to reduce a blocking artifact associated with the CU. After the video encoder 20 performs the deblocking operation, the video encoder 20 may modify reconstructed pixel blocks of CTBs of a picture by using a sample adaptive offset (SAO). In general, the addition of an offset value to pixels in the picture may improve coding efficiency. After performing these operations, the video encoder 20 may store the reconstructed pixel block of the CU in a decoded picture buffer for use in generating a predictive pixel block for another CU.

The video decoder 30 may receive a bitstream. The bitstream may include a coded representation of video data encoded by the video encoder 20. The video decoder 30 may parse the bitstream to extract syntax elements from the bitstream. As a part of extracting at least some syntax elements from the bitstream, the video decoder 30 may entropy-decode data in the bitstream.

When the video decoder 30 performs CABAC decoding, the video decoder 30 may perform regular CABAC decoding on some bins and may perform bypass decoding on other bins. When the video decoder 30 performs regular CABAC decoding on a syntax element, the video decoder 30 may identify a coding context. The video decoder 30 may then divide an interval into a lower sub-interval and an upper sub-interval. One of the sub-intervals may be associated with a value 0 and the other sub-interval may be associated with a value 1. A width of the sub-interval may be proportional to a probability indicated for the associated value by the identified coding context. If an encoded value is within the lower sub-interval, the video decoder 30 may decode a bin having a value associated with the lower sub-interval. If an encoded value is within the upper sub-interval, the video decoder 30 may decode a bin having a value associated with the upper sub-interval. To decode a next bin of the syntax element, the video decoder 30 may repeat these steps respect to an interval within which the sub-interval that includes the encoded value falls. When the video decoder 30 repeats these steps for the next bin, the video decoder 30 may use a probability that is modified based on the probability indicated by the identified coding context and the decoded bin. The video decoder 30 may then de-binarize the bins to restore the syntax element. De-binarization may means selecting a syntax element value according to a mapping between a binary string and a syntax element value.

When the video decoder 30 performs bypass decoding, the video decoder 30 may be able to decode several bins in a single cycle, but when the video decoder 30 performs regular CABAC decoding, the video decoder 30 may generally only be able to decode a single bin in a cycle, or require more than one cycle for a single bin. The bypass decoding may be simpler than the regular CABAC decoding because the video decoder 30 does not need to select a context and can assume that probabilities for both symbols (0 and 1) are ½. In this way, performing bypass encoding and/or decoding on a bin may require less computation than performing regular coding on the bin and may allow for a higher degree of parallelization and a higher throughput.

The video decoder 30 may reconstruct a picture of video data based on syntax elements extracted from a bitstream. A process of reconstructing the video data based on the syntax elements may be generally reciprocal to a process performed by the video encoder 20 to generate the syntax elements. For example, the video decoder 30 may generate, based on syntax elements associated with a CU, predictive pixel blocks for PUs of the CU. In addition, the video decoder 30 may inverse quantize coefficient blocks associated with TUs of the CU. The video decoder 30 may perform an inverse transform on the coefficient blocks to reconstruct residual pixel blocks associated with the TUs of the CU. The video decoder 30 may reconstruct pixel blocks of the CU based on the predictive pixel blocks and the residual pixel blocks.

After the video decoder 30 reconstructs the pixel blocks of the CU, the video decoder 30 may perform a deblocking operation to reduce a blocking artifact associated with the CU. In addition, based on one or more SAO syntax elements, the video decoder 30 may apply the SAO applied by the video encoder 20. After the video decoder 30 performs these operations, the video decoder 30 may store the pixel blocks of the CU in a decoded picture buffer. The decoded picture buffer may provide reference pictures for subsequent motion compensation, intra-prediction, and presentation on a display apparatus.

Figure 2:
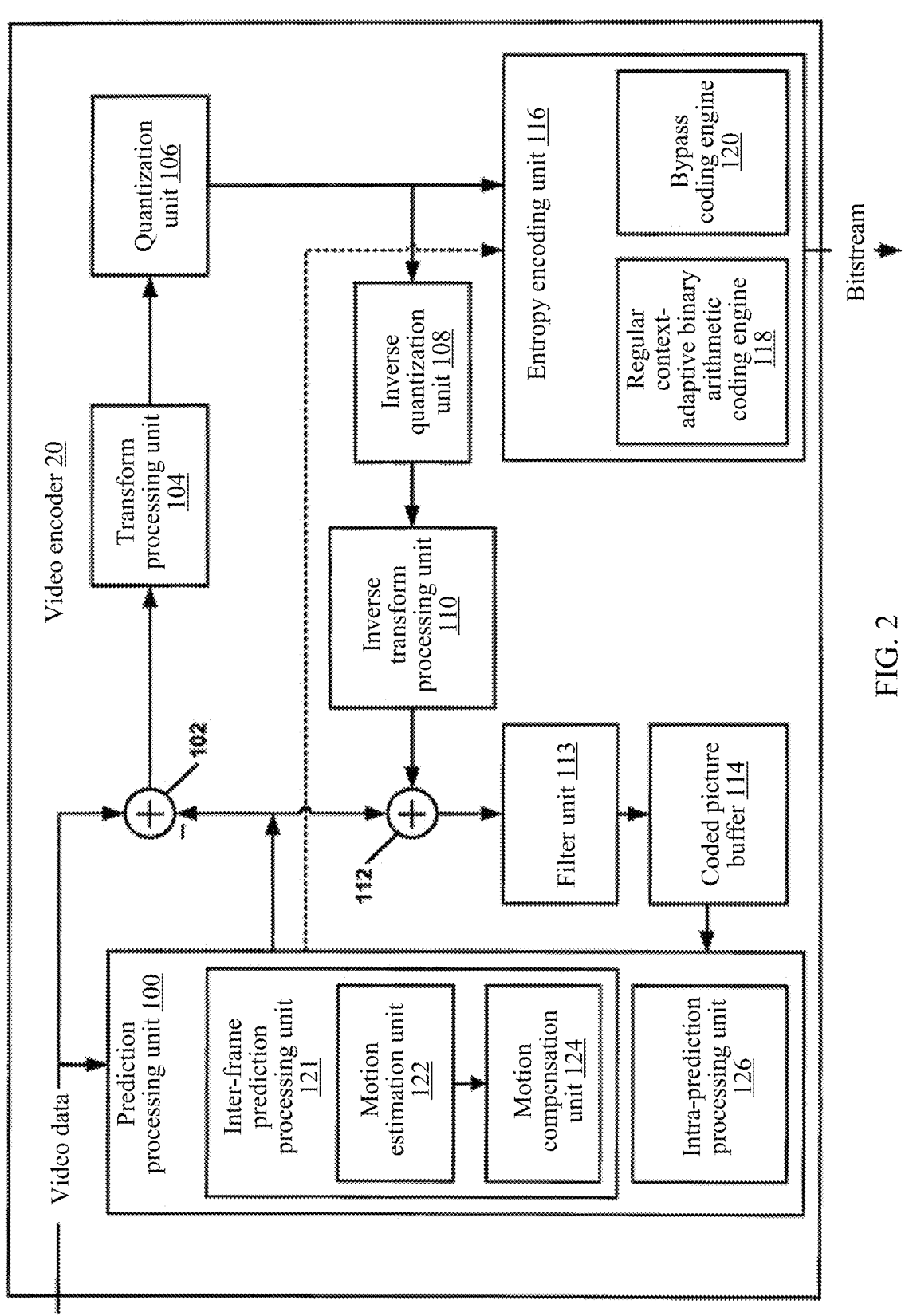
FIG. 2 is a schematic block diagram of a video encoder according to an embodiment of the present application.

FIG. 2 is a block diagram that illustrates an example of a video encoder 20 that is configured to implement the technologies of the present application. FIG. 2 is provided for purposes of explanation and should not be construed as limiting the technologies broadly exemplified and described in the present application. For purposes of explanation, the video encoder 20 is described in the present application in image prediction of HEVC coding. However, the technologies of the present application are applicable to another coding standard or method.

In the example of FIG. 2, the video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. The entropy encoding unit 116 includes a regular CABAC coding engine 118 and a bypass coding engine 120. The prediction processing unit 100 includes an inter-prediction processing unit 121 and an intra-prediction processing unit 126. The inter-prediction processing unit 121 includes a motion estimation unit 122 and a motion compensation unit 124. In another example, the video encoder 20 may include more, fewer, or different functional components.

The video encoder 20 receives video data. To encode the video data, the video encoder 20 may encode each slice of each picture of the video data. As a part of encoding a slice, the video encoder 20 may encode each CTB in the slice. As a part of encoding a CTB, the prediction processing unit 100 may perform quad-tree partitioning on a pixel block associated with the CTB to partition the pixel block into progressively-smaller pixel blocks. The smaller pixel blocks may be associated with CUs. For example, the prediction processing unit 100 may partition a pixel block of a CTB into four equally-sized sub-blocks, partition one or more of the sub-blocks into four equally-sized sub-sub-blocks, and so on.

The video encoder 20 may encode CUs of a CTB in a picture to generate encoded representations of the CUS (that is, coded CUs). The video encoder 20 may encode the CUS of the CTB in a z-scan order. In other words, the video encoder 20 may sequentially encode a top-left CU, a top-right CU, a bottom-left CU, and then a bottom-right CU. When the video encoder 20 encodes a partitioned CU, the video encoder 20 may encode, in the z-scan order, CUs associated with sub-blocks of a pixel block of the partitioned CU.

In addition, as a part of encoding a CU, the prediction processing unit 100 may partition a pixel block of the CU among one or more PUs of the CU. The video encoder 20 and the video decoder 30 may support various PU sizes. Assuming that a size of a particular CU is 2N×2N, the video encoder 20 and the video decoder 30 may support a PU size of 2N×2N or N×N for intra-prediction, and a symmetric PU size of 2N×2N, 2N×N, N×2N, N×N, or similar for inter-prediction. The video encoder 20 and the video decoder 30 may also support asymmetric partitioning for PU sizes of 2N×nU, 2N×nD, nL×2N, and nR×2N for inter-prediction.

The inter-prediction processing unit 121 may generate predictive data for a PU by performing inter-prediction on each PU of a CU. The predictive data for the PU may include a predictive pixel block that corresponds to the PU and motion information of the PU. Slices may be I slices, P slices, or B slices. The inter-prediction processing unit 121 may perform different operations for a PU of a CU depending on whether the PU is in an I slice, a P slice, or a B slice. In the I slice, all PUs are intra-predicted. Therefore, if a PU is in an I slice, the inter-prediction processing unit 121 does not perform inter-prediction on the PU.

If a PU is in a P slice, the motion estimation unit 122 may search reference pictures in a list of reference pictures (such as "list 0") for a reference block of the PU. The reference block of the PU may be a pixel block that most closely corresponds to a pixel block of the PU. The motion estimation unit 122 may generate a reference picture index that indicates a reference picture in the list 0 including the reference block of the PU and a motion vector that indicates a spatial displacement between the pixel block of the PU and the reference block. The motion estimation unit 122 may output the reference picture index and the motion vector as motion information of the PU. The motion compensation unit 124 may generate a predictive pixel block of the PU based on the reference block indicated by the motion information of the PU.

If a PU is in a B slice, the motion estimation unit 122 may perform unidirectional inter-prediction or bi-directional inter-prediction on the PU. To perform unidirectional inter-prediction on the PU, the motion estimation unit 122 may search reference pictures in a first reference picture list ("list 0") or a second reference picture list ("list 1") for a reference block of the PU. The motion estimation unit 122 may output the following as motion information of the PU: a reference picture index that indicates a position in list 0 or list 1 of a reference picture that includes the reference block, a motion vector that indicates a spatial displacement between the pixel block of the PU and the reference block, and a prediction direction indicator that indicates whether the reference picture is in list 0 or list 1.

To perform bi-directional inter-prediction on a PU, the motion estimation unit 122 may search the reference pictures in list 0 for a reference block of the PU and may also search the reference pictures in list 1 for another reference block of the PU. The motion estimation unit 122 may generate reference picture indexes that indicate positions in list 0 and list 1 of reference pictures that include the reference blocks. In addition, the motion estimation unit 122 may generate motion vectors that indicate spatial displacements between the reference blocks and a pixel block of the PU. Motion information of the PU may include the reference picture indexes and the motion vectors of the PU. The motion compensation unit 124 may generate a predictive pixel block of the PU based on the reference blocks indicated by the motion information of the PU.

The intra-prediction processing unit 126 may generate predictive data for a PU by performing intra-prediction on the PU. The predictive data of the PU may include a predictive pixel block of the PU and various syntax elements. The intra-prediction processing unit 126 may perform intra-prediction on PUs in I slices, P slices, and B slices.

To perform intra-prediction on a PU, the intra-prediction processing unit 126 may generate multiple sets of predictive data for the PU by using multiple intra-prediction modes. To generate a set of predictive data for the PU by using an intra-prediction mode, the intra-prediction processing unit 126 may extend samples from sample blocks of adjacent PUs across sample blocks of the PU in a direction associated with the intra-prediction mode. The adjacent PUs may be on the top, top right, top left, or left of the PU, assuming that a left-to-right, top-to-bottom encoding order is used for PUS, CUs, and CTBs. The intra-prediction processing unit 126 may use various quantities of intra-prediction modes, for example, 33 directional intra-prediction modes. In some examples, the quantity of intra-prediction modes may depend on a size of a pixel block of the PU.

The prediction processing unit 100 may select predictive data for PUs of a CU from predictive data that is generated by the inter-prediction processing unit 121 for the PUs or predictive data that is generated by intra-prediction processing unit 126 for the PUs. In some examples, the prediction processing unit 100 selects the predictive data for the PUs of the CU based on rate/distortion metrics of the sets of predictive data. Predictive pixel blocks of the selected predictive data may be referred herein as selected predictive pixel blocks.

The residual generation unit 102 may generate, based on a pixel block of a CU and selected predictive pixel blocks of PUs of the CU, a residual pixel block of the CU. For example, the residual generation unit 102 may generate the residual pixel block of the CU, so that each sample in the residual pixel block has a value equal to a difference between a sample in the pixel block of the CU and a corresponding sample in the selected predictive pixel block of the PU of the CU.

The prediction processing unit 100 may perform quad-tree partitioning to partition the residual pixel block of the CU into sub-blocks. Each unpartitioned residual pixel block may be associated with a different TU of the CU. Sizes and positions of residual pixel blocks associated with TUs of the CU may or may not be based on sizes and positions of pixel blocks of the PUs of the CU.

Because pixels of the residual pixel blocks of the TUs each may include a luminance sample and two chrominance samples, each of the TUs may be associated with a block of luminance samples and two blocks of chrominance samples. The transform processing unit 104 may generate a coefficient block for each TU of the CU by applying one or more transforms to a residual sample block associated with the TU. The transform processing unit 104 may apply various transforms to the residual sample block associated with the TU. For example, the transform processing unit 104 may apply a discrete cosine transform (DCT), a directional transform, or a conceptually-similar transform to the residual sample block.

The quantization unit 106 may quantize coefficients in a coefficient block. The quantization process may reduce a bit depth associated with some or all of the coefficients. For example, an n-bit coefficient may be rounded down to an m-bit coefficient during quantization, where n is greater than m. The quantization unit 106 may quantize a coefficient block associated with a TU of a CU based on a quantization parameter (QP) value associated with the CU. The video encoder 20 may adjust a degree of quantization applied to coefficient blocks associated with the CU by adjusting the QP value associated with the CU.

The inverse quantization unit 108 and the inverse transform processing unit 110 may apply inverse quantization and an inverse transform to a coefficient block separately, to reconstruct a residual sample block from the coefficient block. The reconstruction unit 112 may add a sample of the reconstructed residual sample block to a corresponding sample from one or more predictive sample blocks generated by the prediction processing unit 100 to generate a reconstructed sample block associated with a TU. By reconstructing sample blocks for each TU of a CU in this way, the video encoder 20 may reconstruct the pixel block of the CU.

The filter unit 113 may perform a deblocking operation to reduce a blocking artifact in the pixel block associated with the CU. In addition, the filter unit 113 may apply an SAO offset determined by the prediction processing unit 100 to the reconstructed sample block to restore the pixel block. The filter unit 113 may generate a sequence of SAO syntax elements for a CTB. The SAO syntax elements may include regular CABAC-coded bins and bypass-coded bins. According to the technologies of the present application, within the sequence, none of bypass-coded bins for a color component is between two of regular CABAC-coded bins for the same color component.

The decoded picture buffer 114 may store the reconstructed pixel block. The inter-prediction processing unit 121 may perform inter-prediction on a PU of another picture by using a reference picture that includes the reconstructed pixel block. In addition, the intra-prediction processing unit 126 may perform intra-prediction on another PU in the same picture as the CU by using the reconstructed pixel block in the decoded picture buffer 114.

The entropy encoding unit 116 may receive data from another functional component of the video encoder 20. For example, the entropy encoding unit 116 may receive coefficient blocks from the quantization unit 106 and may receive syntax elements from the prediction processing unit 100. The entropy encoding unit 116 may perform one or more entropy encoding operations on the data to generate entropy-encoded data. For example, the entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a probability interval partitioning entropy (PIPE) coding operation, or another type of entropy encoding operation on the data. In a particular example, the entropy encoding unit 116 may encode the SAO syntax elements generated by the filter unit 113. As a part of encoding the SAO syntax elements, the entropy encoding unit 116 may encode the regular CABAC-coded bins of the SAO syntax elements by using the regular CABAC coding engine 118 and may encode the bypass-coded bins by using the bypass coding engine 120.

According to the technologies of the present application, the inter-prediction processing unit 121 determines a set of inter-frame candidate prediction modes. In this way, the video encoder 20 is an example of a video encoder. According to the technologies of the present application, the video encoder is configured to: determine, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; determine, in the set of candidate prediction modes, a prediction mode for the to-be-processed image unit; determine a predicted image of the to-be-processed image unit according to the prediction mode; and encode first indication information into a bitstream, where the first indication information indicates the prediction mode.

FIG. 3 is a flowchart illustrating an example operation 200 of a video encoder for encoding video data, according to one or more technologies of the present application. FIG. 3 is provided as an example. In another example, the technologies of the present application may be implemented by using more, fewer, or different steps than those shown in the example of FIG. 3. According to the example method of FIG. 3, the video encoder 20 performs the following steps.

S210. Determine, according to information about adjacent image units adjacent to a to-be-processed image unit, whether a set of candidate prediction modes for the to-be-processed image unit includes an affine merge mode.

Specifically, as shown in FIG. 4, blocks A, B, C, D, and E are adjacent reconstructed blocks of a current to-be-encoded block, and are respectively located on the top, left, top right, bottom left, and top left of the to-be-encoded block. It may be determined, according to encoding information of the adjacent reconstructed blocks, whether a set of candidate prediction modes for the current to-be-encoded block includes an affine merge mode.

It should be understood that, FIG. 4 in this embodiment of the present application shows a quantity and positions of the adjacent reconstructed blocks of the to-be-encoded block for illustration purposes. The quantity of the adjacent reconstructed blocks may be more or less than five, and no limitation is imposed thereto.

In a first possible implementation, it is determined whether there is a block whose prediction type is affine prediction among the adjacent reconstructed blocks. If there is no block whose prediction type is affine prediction among the adjacent reconstructed blocks, the set of candidate prediction modes for the to-be-encoded block does not include the affine merge mode; or if there is a block whose prediction type is affine prediction among the adjacent reconstructed blocks, an encoding process shown in FIG. 2 is separately performed according to two cases: The set of candidate prediction modes for the to-be-encoded block includes the affine merge mode, and the set of candidate prediction modes for the to-be-encoded block does not include the affine merge mode. If encoding performance of the first case is better, the set of candidate prediction modes for the to-be-encoded block includes the affine merge mode, and indication information, which may be assumed as second indication information, is set to 1 and is encoded into a bitstream. Otherwise, the set of candidate prediction modes for the to-be-encoded block does not include the affine merge mode, and second indication information is set to 0 and is encoded into a bitstream.

In a second possible implementation, it is determined whether there is a block whose prediction type is affine prediction among the adjacent reconstructed blocks. If there is no block whose prediction type is affine prediction among the adjacent reconstructed blocks, the set of candidate prediction modes for the to-be-encoded block does not include the affine merge mode; or if there is a block whose prediction type is affine prediction among the adjacent reconstructed blocks, the set of candidate prediction modes for the to-be-encoded block includes the affine merge mode.

In a third possible implementation, the adjacent reconstructed blocks include multiple affine modes, which include, for example, a first affine mode or a second affine mode, and correspondingly, the affine merge mode includes a first affine merge mode that merges the first affine mode or a second affine merge mode that merges the second affine mode. Quantities of first affine modes, second affine modes, and non-affine modes among the adjacent reconstructed blocks are separately obtained through statistics collection. When the first affine mode ranks first in quantity among the adjacent reconstructed blocks, the set of candidate prediction modes includes the first affine merge mode and does not include the second affine merge mode. When the second affine mode ranks first in quantity among the adjacent reconstructed blocks, the set of candidate prediction modes includes the second affine merge mode and does not include the first affine merge mode. When the non-affine mode ranks first in quantity among the adjacent reconstructed blocks, the set of candidate prediction modes does not include the affine merge mode.

Alternatively, in the third possible implementation, when the first affine mode ranks first in quantity among the adjacent reconstructed blocks, the set of candidate prediction modes includes the first affine merge mode and does not include the second affine merge mode. When the second affine mode ranks first in quantity among the adjacent reconstructed blocks, the set of candidate prediction modes includes the second affine merge mode and does not include the first affine merge mode. When the non-affine mode ranks first in quantity among the adjacent reconstructed blocks, it is obtained through statistics collection whether the first affine mode or the second affine mode ranks second in quantity among the adjacent reconstructed blocks. When the first affine mode ranks second in quantity among the adjacent reconstructed blocks, the set of candidate prediction modes includes the first affine merge mode and does not include the second affine merge mode. When the second affine mode ranks second in quantity among the adjacent reconstructed blocks, the set of candidate prediction modes includes the second affine merge mode and does not include the first affine merge mode.

In a fourth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. If either of the conditions is not satisfied, the set of candidate prediction modes for the to-be-encoded block does not include the affine merge mode. If the two conditions are both satisfied, an encoding process shown in FIG. 2 is separately performed according to two cases: The set of candidate prediction modes for the to-be-encoded block includes the affine merge mode, and the set of candidate prediction modes for the to-be-encoded block does not include the affine merge mode. If encoding performance of the first case is better, the set of candidate prediction modes for the to-be-encoded block includes the affine merge mode, and indication information, which may be assumed as third indication information, is set to 1 and is encoded into a bitstream. Otherwise, the set of candidate prediction modes for the to-be-encoded block does not include the affine merge mode, and third indication information is set to 0 and is encoded into a bitstream.

It should be understood that, the determining condition (2) in this embodiment of the present application means that the width of the adjacent block in the affine mode is less than the width of the to-be-encoded block and the height of the adjacent block in the affine mode is less than the height of the to-be-encoded block. In another embodiment, alternatively, the determining condition may be: the width of the adjacent block in the affine mode is less than the width of the to-be-encoded block or the height of the adjacent block in the affine mode is less than the height of the to-be-encoded block, and no limitation is imposed thereto.

In a fifth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. If either of the conditions is not satisfied, the set of candidate prediction modes for the to-be-encoded block does not include the affine merge mode. If the two conditions are both satisfied, the set of candidate prediction modes for the to-be-encoded block includes the affine merge mode.

It should be understood that, in this embodiment of the present application, prediction types and sizes of the adjacent reconstructed blocks are used as a basis for determining the set of candidate prediction modes for the current to-be-encoded block, and attribute information of the adjacent reconstructed blocks that is obtained by means of parsing may be further used for determining. This is not limited herein.

It should be further understood that, in various possible implementations in this embodiment of the present application, for illustration purposes, such as the second possible implementation, the following determining criteria may be used to determine whether there is a block whose prediction type is affine prediction among the adjacent reconstructed blocks. For illustration purposes, when prediction types of at least two adjacent blocks are the affine mode, the set of candidate prediction modes for the to-be-encoded block includes the affine merge mode; otherwise, the set of candidate prediction modes for the to-be-encoded block does not include the affine merge mode. Alternatively, a quantity of adjacent blocks whose prediction type is the affine mode may also be at least three or at least four, and no limitation is imposed thereto.

It should be further understood that, in various possible implementations in this embodiment of the present application, for illustration purposes, such as in the fifth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. The second determining condition, for illustration purposes, may also be whether the width and the height of the adjacent block in the affine mode are less than ½, ⅓, or ¼ of the width and the height of the to-be-encoded block, and no limitation is imposed thereto.

It should be further understood that, in this embodiment of the present application, that the indication information is set to 0 or 1 is for illustration purposes. Alternatively, a reverse setting may be performed. For illustration purposes, for example, in the first possible implementation, it may be determined whether there is a block whose prediction type is affine prediction among the adjacent reconstructed blocks. If there is no block whose prediction type is affine prediction among the adjacent reconstructed blocks, the set of candidate prediction modes for the to-be-encoded block does not include the affine merge mode; or if there is a block whose prediction type is affine prediction among the adjacent reconstructed blocks, an encoding process shown in FIG. 2 is separately performed according to two cases: The set of candidate prediction modes for the to-be-encoded block includes the affine merge mode, and the set of candidate prediction modes for the to-be-encoded block does not include the affine merge mode. If encoding performance of the first case is better, the set of candidate prediction modes for the to-be-encoded block includes the affine merge mode, and indication information, which may be assumed as second indication information, is set to 0 and is encoded into a bitstream. Otherwise, the set of candidate prediction modes for the to-be-encoded block does not include the affine merge mode, and second indication information is set to 1 and is encoded into a bitstream.

S220. Determine, in the set of candidate prediction modes, a prediction mode for the to-be-processed image unit.

The set of candidate prediction modes is the set of candidate prediction modes determined in S210. Each prediction mode in the set of candidate prediction modes is sequentially used to perform the encoding process shown in FIG. 2, to select a mode with optimal encoding performance as the prediction mode for the to-be-encoded block.

It should be understood that, in this embodiment of the present application, an objective of performing the encoding process shown in FIG. 2 is to select a prediction mode with optimal encoding performance. In the selection process, performance/cost ratios of the prediction modes may be compared. Performance is indicated by quality of image restoration, and a cost is indicated by a bit rate of encoding. Alternatively, only performance or costs of the prediction modes may be compared. Correspondingly, all encoding steps shown in FIG. 2 may be completed, or an encoding process is stopped after indicators needing to be compared are obtained. For example, if the prediction modes are compared in terms of performance only, the encoding process can be stopped after a prediction unit performs its steps, and no limitation is imposed thereto.

S230. Determine a predicted image of the to-be-processed image unit according to the prediction mode.

The H.265 standard and application files such as CN201010247275.7 cited in the foregoing describe in detail a process in which a predicted image of a to-be-encoded block is generated according to a prediction mode, including a prediction mode for a translational model, an affine prediction mode, an affine merge mode, or the like, and details are not described herein again.

S240. Encode first indication information into a bitstream.

The prediction mode determined in S220 is encoded into the bitstream. It should be understood that, the step may be performed at any moment after S220, and no particular limitation is imposed on a step order, provided that the step corresponds a step of decoding the first indication information by a decoding side.

FIG. 5 is a block diagram illustrating an example of another video encoder 40 for encoding video data, according to one or more technologies of the present application.

The video encoder 40 includes: a first determining module 41, a second determining module 42, a third determining module 43, and an encoding module 44.

The first determining module 41 is configured to perform S210 of determining, according to information about adjacent image units adjacent to a to-be-processed image unit, whether a set of candidate prediction modes for the to-be-processed image unit includes an affine merge mode.

The second determining module 42 is configured to perform S220 of determining, in the set of candidate prediction modes, a prediction mode for the to-be-processed image unit.

The third determining module 43 is configured to perform S230 of determining a predicted image of the to-be-processed image unit according to the prediction mode.

The encoding module 44 is configured to perform S240 of encoding first indication information into a bitstream.

Because motion information of adjacent blocks is correlated, there is a very large probability that a current block and an adjacent block have a same or similar prediction mode. In this embodiment of the present application, prediction mode information of the current block is derived by determining information about adjacent blocks, reducing a bit rate of encoding a prediction mode, thereby improving encoding efficiency.

FIG. 6 is a flowchart illustrating an example operation 300 of a video encoder for encoding video data, according to one or more technologies of the present application. FIG. 6 is provided as an example. In another example, the technologies of the present application may be implemented by using more, fewer, or different steps than those shown in the example of FIG. 6. According to the example method of FIG. 6, the video encoder 20 performs the following steps.

S310. Encode indication information of a set of candidate prediction modes for a first to-be-processed image area.

When a set of candidate translational modes is used as a set of candidate modes for the first to-be-processed image area, first indication information is set to 0 and the first indication information is encoded into a bitstream, where the translational mode indicates a prediction mode that a predicted image is obtained by using a translational model. When a set of candidate translational modes and a set of candidate affine modes are used as a set of candidate modes for the first to-be-processed image area, first indication information is set to 1 and the first indication information is encoded into a bitstream, where the affine mode indicates a prediction mode that a predicted image is obtained by using an affine model. The first to-be-processed image area may be any one of an image frame group, an image frame, an image tile set, an image slice set, an image tile, an image slice, an image encoding unit set, or an image encoding unit. Correspondingly, the first indication information is encoded in a header of the image frame group, for example, a video parameter set (VPS), a sequence parameter set (SPS), supplemental enhancement information (SEI), or an image frame header, or for example, an image parameter set (PPS), a header of the image tile set, a header of the image slice set, or a header of the image tile, or for example, an image tile header, an image slice header, a header of the image encoding unit set, or a header of the image encoding unit.

It should be understood that, the first to-be-processed image area in this step may be preconfigured, or may be adaptively determined in an encoding process. A representation of a range of the first to-be-processed image area may be learned from a protocol of an encoding/decoding side, or a range of the first to-be-processed image area may be encoded into the bitstream for transmission, and no limitation is imposed thereto.

It should be further understood that, the set of candidate prediction modes may be preconfigured, or may be determined after comparison of encoding performance, and no limitation is imposed thereto.

It should be further understood that, in this embodiment of the present application, that the indication information is set to 0 or 1 is for illustration purposes. Alternatively, a reverse setting may be performed.

S320. Determine, in the set of candidate prediction modes for the first to-be-processed image area for a to-be-processed image unit in the first to-be-processed image area, a prediction mode for the to-be-processed image unit.

A specific method is similar to S220, and details are not described herein again.

S330. Determine a predicted image of the to-be-processed image unit according to the prediction mode.

A specific method is similar to S230, and details are not described herein again.

S340. Encode the prediction mode selected for the to-be-processed image unit into a bitstream.

A specific method is similar to S240, and details are not described herein again.

FIG. 7 is a block diagram illustrating an example of another video encoder 50 for encoding video data, according to one or more technologies of the present application.

The video encoder 50 includes: a first encoding module 51, a first determining module 52, a second determining module 53, and a second encoding module 54.

The first encoding module 51 is configured to perform S310 of encoding indication information of a set of candidate prediction modes for a first to-be-processed image area.

The first determining module 52 is configured to perform S320 of determining, in the set of candidate prediction modes for the first to-be-processed image area for a to-be-processed image unit in the first to-be-processed image area, a prediction mode for the to-be-processed image unit.

The second determining module 53 is configured to perform S330 of determining a predicted image of the to-be-processed image unit according to the prediction mode.

The second encoding module 54 is configured to perform S340 of encoding the prediction mode selected for the to-be-processed image unit into the bitstream.

Because motion information of adjacent blocks is correlated, there is a very large probability that there is only a translation motion and no affine motion in a same area. In this embodiment of the present application, a set of candidate prediction modes marking an area level is set, avoiding a bit rate of encoding a redundant mode, thereby improving encoding efficiency.

Figure 8:
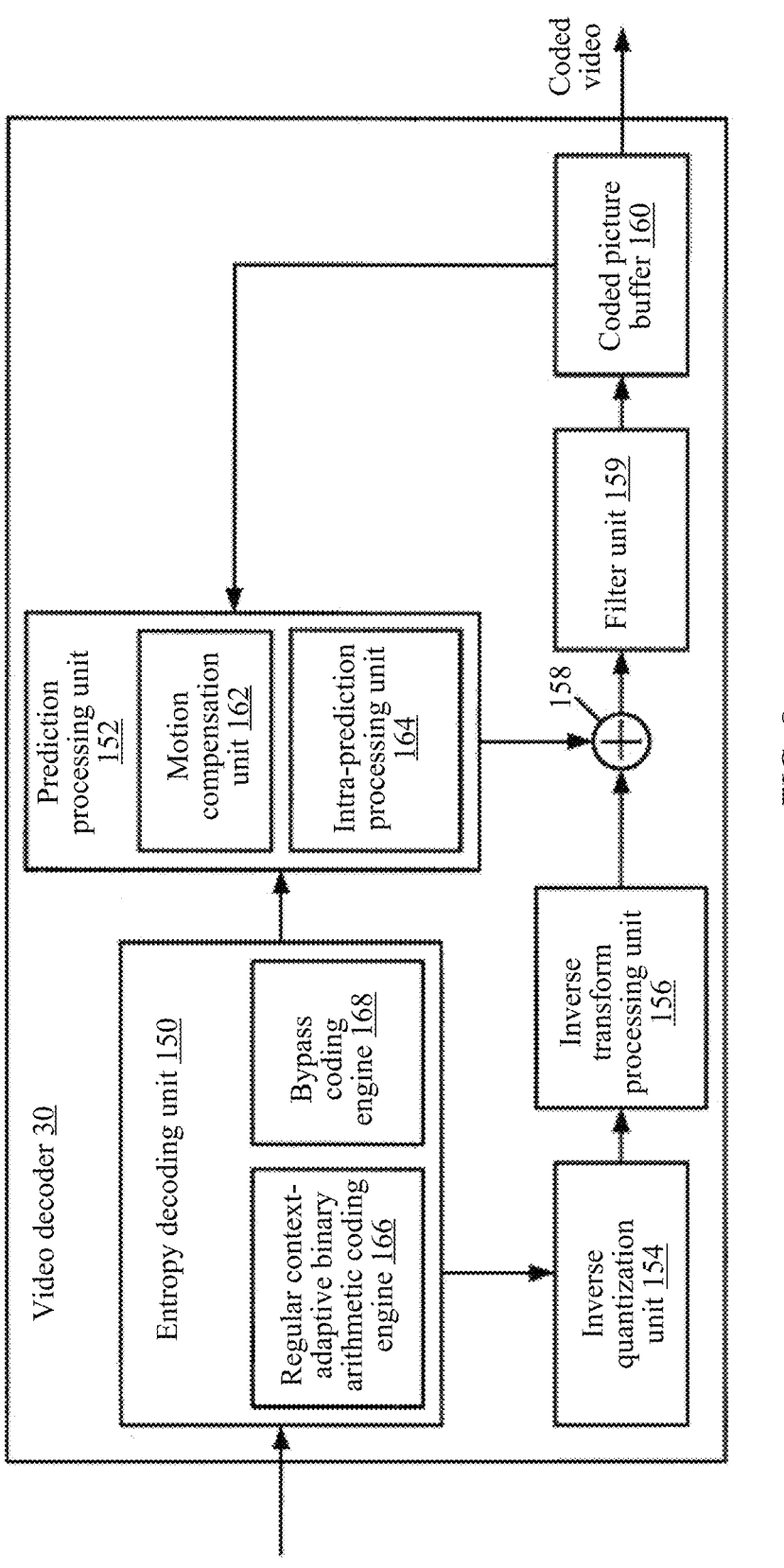
FIG. 8 is a schematic block diagram of a video decoder according to an embodiment of the present application.

FIG. 8 is a block diagram illustrating an example of a video decoder 30 that is configured to implement the technologies of the present application. FIG. 8 is provided for purposes of explanation and should not be construed as limiting the technologies broadly exemplified and described in the present application. For purposes of explanation, the video decoder 30 is described in the present application in image prediction of HEVC coding. However, the technologies of the present application are applicable to another coding standard or method.

In the example of FIG. 8, the video decoder 30 includes an entropy-decoding unit 150, a prediction processing unit 152, an inverse quantization unit 154, an inverse transform processing unit 156, a reconstruction unit 158, a filter unit 159, and a decoded picture buffer 160. The prediction processing unit 152 includes a motion compensation unit 162 and an intra-prediction processing unit 164. The entropy-decoding unit 150 includes a regular CABAC coding engine 166 and a bypass coding engine 168. In another example, the video decoder 30 may include more, fewer, or different functional components.

The video decoder 30 may receive a bitstream. The entropy-decoding unit 150 may parse the bitstream to extract syntax elements from the bitstream. As a part of parsing the bitstream, the entropy-decoding unit 150 may entropy-decode entropy-encoded syntax elements in the bitstream. The prediction processing unit 152, the inverse quantization unit 154, the inverse transform processing unit 156, the reconstruction unit 158, and the filter unit 159 may generate decoded video data based on the syntax elements extracted from the bitstream.

The bitstream may include a sequence of coded SAO syntax elements of a CTB. The SAO syntax elements may include regular CABAC-coded bins and bypass-coded bins. According to the technologies of the present application, in the sequence of coded SAO syntax elements, none of the bypass-coded bins is between two of the regular CABAC-coded bins. The entropy-decoding unit 150 may decode the SAO syntax elements. As a part of encoding the SAO syntax elements, the entropy-decoding unit 150 may decode the regular CABAC-coded bins by using the regular CABAC coding engine 166 and may decode the bypass-coded bins by using the bypass coding engine 168.

In addition, the video decoder 30 may perform a reconstruction operation on a non-partitioned CU. To perform a reconstruction operation on the non-partitioned CU, the video decoder 30 may perform a reconstruction operation on each TU of the CU. By performing the reconstruction operation on each TU of the CU, the video decoder 30 may reconstruct residual pixel blocks associated with the CU.

As a part of performing a reconstruction operation on a TU of a CU, the inverse quantization unit 154 may inversely quantize (that is, de-quantize) coefficient blocks associated with the TU. The inverse quantization unit 154 may determine a degree of quantization by using a QP value associated with the CU of the TU, and determine a degree of inverse quantization to be applied by the inverse quantization unit 154.

After the inverse quantization unit 154 inversely quantizes the coefficient blocks, the inverse transform processing unit 156 may apply one or more inverse transforms to the coefficient blocks, to generate residual sample blocks associated with the TU. For example, the inverse transform processing unit 156 may apply an inverse DCT, an inverse integer transform, an inverse Karhunen-Loeve transform (KLT), an inverse rotational transform, an inverse directional transform, or another inverse transform to the coefficient blocks.

If a PU is encoded by means of intra-prediction, the intra-prediction processing unit 164 may perform intra-prediction to generate a predictive sample block for the PU. The intra-prediction processing unit 164 may use an intra-prediction mode to generate the predictive pixel block for the PU based on pixel blocks of spatially-adjacent PUs. The intra-prediction processing unit 164 may determine the intra-prediction mode for the PU based on one or more syntax elements obtained from the bitstream by means of parsing.

The motion compensation unit 162 may construct a first reference picture list (list 0) and a second reference picture list (list 1) based on the syntax elements extracted from the bitstream. In addition, if a PU is encoded by means of inter-prediction, the entropy-decoding unit 150 may extract motion information of the PU. The motion compensation unit 162 may determine one or more reference blocks for the PU based on the motion information of the PU. The motion compensation unit 162 may generate a predictive pixel block for the PU based on the one or more reference blocks for the PU.

The reconstruction unit 158 may use the residual pixel blocks associated with the TUs of the CU and predictive pixel blocks (that is, intra-prediction data or inter-prediction data) of PUs of the CU, when applicable, to reconstruct a pixel block of the CU. In particular, the reconstruction unit 158 may add samples of the residual pixel blocks to corresponding samples of the predictive pixel blocks to reconstruct the pixel block of the CU.

The filter unit 159 may perform a deblocking operation to reduce a blocking artifact associated with the pixel block of the CU of the CTB. In addition, the filter unit 159 may modify the pixel block of the CTB based on the SAO syntax elements parsed from the bitstream. For example, the filter unit 159 may determine values based on the SAO syntax elements of the CTB, and add the determined values to samples in the reconstructed pixel block of the CTB. By modifying at least some of pixel blocks of CTBs of a picture, the filter unit 159 may modify a reconstructed picture of video data based on SAO syntax elements.

The video decoder 30 may store the pixel block of the CU in the decoded picture buffer 160. The decoded picture buffer 160 may provide reference pictures for subsequent motion compensation, intra-prediction, and presentation on a display apparatus (such as the display apparatus 32 in FIG. 1). For example, the video decoder 30 may perform, based on the pixel block in the decoded picture buffer 160, an intra-prediction or inter-prediction operation on a PU of another CU.

According to the technologies of the present application, the prediction processing unit 152 determines a set of inter-frame candidate prediction modes. In this way, the video decoder 30 is an example of a video decoder. According to the technologies of the present application, the video decoder is configured to: determine, according to information about adjacent image units adjacent to a to-be-processed image unit, whether a set of candidate prediction modes for the to-be-processed image unit includes an affine merge mode, where the affine merge mode indicates that respective predicted images of the to-be-processed image unit and the adjacent image units of the to-be-processed image unit are obtained by using a same affine model; parse a bitstream to obtain first indication information; determine, in the set of candidate prediction modes, a prediction mode for the to-be-processed image unit according to the first indication information; and determine a predicted image of the to-be-processed image unit according to the prediction mode.

FIG. 9 is a flowchart illustrating an example operation 400 of a video decoder for decoding video data, according to one or more technologies of the present application. FIG. 9 is provided as an example. In another example, the technologies of the present application may be implemented by using more, fewer, or different steps than those shown in the example of FIG. 9. According to the example method of FIG. 9, the video decoder 30 performs the following steps.

S410. Determine, according to information about adjacent image units adjacent to a to-be-processed image unit, whether a set of candidate prediction modes for the to-be-processed image unit includes an affine merge mode.

Specifically, as shown in FIG. 4, blocks A, B, C, D, and E are adjacent reconstructed blocks of a current to-be-encoded block, and are respectively located on the top, left, top right, bottom left, and top left of the to-be-encoded block. It may be determined, according to encoding information of the adjacent reconstructed blocks, whether a set of candidate prediction modes for the current to-be-encoded block includes an affine merge mode.

It should be understood that, FIG. 4 in this embodiment of the present application shows a quantity and positions of the adjacent reconstructed blocks of the to-be-encoded block for illustration purposes. The quantity of the adjacent reconstructed blocks may be more or less than five, and no limitation is imposed thereto.

In a first possible implementation, it is determined whether there is a block whose prediction type is affine prediction among the adjacent reconstructed blocks. When a prediction mode for at least one of the adjacent image units is obtaining a predicted image by using an affine model, the bitstream is parsed to obtain second indication information. When the second indication information is 1, the set of candidate prediction modes includes the affine merge mode; or when the second indication information is 0, the set of candidate prediction modes does not include the affine merge mode; otherwise, the set of candidate prediction modes does not include the affine merge mode.

In a second possible implementation, it is determined whether there is a block whose prediction type is affine prediction among the adjacent reconstructed blocks. If there is no block whose prediction type is affine prediction among the adjacent reconstructed blocks, the set of candidate prediction modes for the to-be-encoded block does not include the affine merge mode; or if there is a block whose prediction type is affine prediction among the adjacent reconstructed blocks, the set of candidate prediction modes for the to-be-encoded block includes the affine merge mode.

In a third possible implementation, the adjacent reconstructed blocks include multiple affine modes, which include, for example, a first affine mode or a second affine mode, and correspondingly, the affine merge mode includes a first affine merge mode that merges the first affine mode or a second affine merge mode that merges the second affine mode. Quantities of first affine modes, second affine modes, and non-affine modes among the adjacent reconstructed blocks are separately obtained through statistics collection. When the first affine mode ranks first in quantity among the adjacent reconstructed blocks, the set of candidate prediction modes includes the first affine merge mode and does not include the second affine merge mode. When the second affine mode ranks first in quantity among the adjacent reconstructed blocks, the set of candidate prediction modes includes the second affine merge mode and does not include the first affine merge mode. When the non-affine mode ranks first in quantity among the adjacent reconstructed blocks, the set of candidate prediction modes does not include the affine merge mode.

Alternatively, in the third possible implementation, when the first affine mode ranks first in quantity among the adjacent reconstructed blocks, the set of candidate prediction modes includes the first affine merge mode and does not include the second affine merge mode. When the second affine mode ranks first in quantity among the adjacent reconstructed blocks, the set of candidate prediction modes includes the second affine merge mode and does not include the first affine merge mode. When the non-affine mode ranks first in quantity among the adjacent reconstructed blocks, it is obtained through statistics collection whether the first affine mode or the second affine mode ranks second in quantity among the adjacent reconstructed blocks. When the first affine mode ranks second in quantity among the adjacent reconstructed blocks, the set of candidate prediction modes includes the first affine merge mode and does not include the second affine merge mode. When the second affine mode ranks second in quantity among the adjacent reconstructed blocks, the set of candidate prediction modes includes the second affine merge mode and does not include the first affine merge mode.

In a fourth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. If either of the conditions is not satisfied, the set of candidate prediction modes for the to-be-encoded block does not include the affine merge mode. If the two conditions are both satisfied, a bitstream is parsed to obtain third indication information. When the third indication information is 1, the set of candidate prediction modes includes the affine merge mode, or when the third indication information is 0, the set of candidate prediction modes does not include the affine merge mode; otherwise, the set of candidate prediction modes does not include the affine merge mode.

It should be understood that, the determining condition (2) in this embodiment of the present application means that the width of the adjacent block in the affine mode is less than the width of the to-be-encoded block and the height of the adjacent block in the affine mode is less than the height of the to-be-encoded block. In another embodiment, alternatively, the determining condition may be: the width of the adjacent block in the affine mode is less than the width of the to-be-encoded block or the height of the adjacent block in the affine mode is less than the height of the to-be-encoded block, and no limitation is imposed thereto.

In a fifth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. If either of the conditions is not satisfied, the set of candidate prediction modes for the to-be-encoded block does not include the affine merge mode. If the two conditions are both satisfied, the set of candidate prediction modes for the to-be-encoded block includes the affine merge mode.

It should be understood that, in this embodiment of the present application, prediction types and sizes of the adjacent reconstructed blocks are used as a basis for determining the set of candidate prediction modes for the current to-be-encoded block, and attribute information of the adjacent reconstructed blocks that is obtained by means of parsing may be further used for determining, provided that the method corresponds to an encoding side. This is not limited herein.

It should be further understood that, in various possible implementations in this embodiment of the present application, for illustration purposes, such as the second possible implementation, the following determining criteria may be used to determine whether there is a block whose prediction type is affine prediction among the adjacent reconstructed blocks. For illustration purposes, when prediction types of at least two adjacent blocks are the affine mode, the set of candidate prediction modes for the to-be-encoded block includes the affine merge mode; otherwise, the set of candidate prediction modes for the to-be-encoded block does not include the affine merge mode. Alternatively, a quantity of adjacent blocks whose prediction type is the affine mode may also be at least three or at least four, provided that this corresponds to the encoding side, and no limitation is imposed thereto.

It should be further understood that, in various possible implementations in this embodiment of the present application, for illustration purposes, such as in the fifth possible implementation, it is determined whether two conditions are satisfied: (1) whether there is a block whose prediction type is an affine mode among the adjacent reconstructed blocks; and (2) whether a width and a height of the adjacent block in the affine mode are less than a width and a height of the to-be-encoded block. The second determining condition, for illustration purposes, may also be whether the width and the height of the adjacent block in the affine mode are less than $\frac{1}{2}$, $\frac{1}{3}$, or $\frac{1}{4}$ of the width and the height of the to-be-encoded block, provided that this corresponds to the encoding side, and no limitation is imposed thereto.

It should be further understood that, in this embodiment of the present application, the indication information being set to 0 or 1 corresponds to the encoding side.

S420. Parse a bitstream to obtain first indication information.

The first indication information indicates index information of a prediction mode for a to-be-decoded block. This step corresponds to step S240 on the encoding side.

S430. Determine, in the set of candidate prediction modes, a prediction mode for the to-be-processed image unit according to the first indication information.

Different sets of candidate prediction modes correspond to different lists of prediction modes. A list of prediction modes that corresponds to the set of candidate prediction modes determined in S410 is searched for according to the index information obtained in S420, so that the prediction mode for the to-be-decoded block can be found.

S440. Determine a predicted image of the to-be-processed image unit according to the prediction mode.

A specific method is similar to S230, and details are not described herein again.

FIG. 10 is a block diagram illustrating an example of another video decoder 60 for decoding video data, according to one or more technologies of the present application.

The video decoder 60 includes: a first determining module 61, a parsing module 62, a second determining module 63, and a third determining module 64.

The first determining module 61 is configured to perform S410 of determining, according to information about adjacent image units adjacent to a to-be-processed image unit, whether a set of candidate prediction modes for the to-be-processed image unit includes an affine merge mode.

The parsing module 62 is configured to perform S420 of parsing a bitstream to obtain first indication information.

The second determining module 63 is configured to perform S430 of determining, in the set of candidate prediction modes, a prediction mode for the to-be-processed image unit according to the first indication information.

The third determining module 64 is configured to perform S440 of determining a predicted image of the to-be-processed image unit according to the prediction mode.

Because motion information of adjacent blocks is correlated, there is a very large probability that a current block and an adjacent block have a same or similar prediction mode. In this embodiment of the present application, prediction mode information of the current block is derived by determining information about adjacent blocks, reducing a bit rate of encoding a prediction mode, thereby improving encoding efficiency.

FIG. 11 is a flowchart illustrating an example operation 500 of a video decoder for decoding video data, according to one or more technologies of the present application. FIG. 11 is provided as an example. In another example, the technologies of the present application may be implemented by using more, fewer, or different steps than those shown in the example of FIG. 11. According to the example method of FIG. 11, the video decoder 20 performs the following steps.

S510. Parse a bitstream to obtain first indication information.

The first indication information indicates whether a set of candidate modes for a first to-be-processed image area includes an affine motion model. This step corresponds to step S310 on the encoding side.

S520. Determine a set of candidate modes for a first to-be-processed image area according to the first indication information.

When the first indication information is 0, a set of candidate translational modes is used as the set of candidate modes for the first to-be-processed image area, where the translational mode indicates a prediction mode that a predicted image is obtained by using a translational model. When the first indication information is 1, a set of candidate translational modes and a set of candidate affine modes are used as the set of candidate modes for the first to-be-processed image area, where the affine mode indicates a prediction mode that a predicted image is obtained by using an affine model. The first to-be-processed image area may be any one of an image frame group, an image frame, an image tile set, an image slice set, an image tile, an image slice, an image encoding unit set, or an image encoding unit. Correspondingly, the first indication information is encoded in a header of the image frame group, for example, a video parameter set (VPS), a sequence parameter set (SPS), supplemental enhancement information (SEI), or an image frame header, or for example, an image parameter set (PPS), a header of the image tile set, a header of the image slice set, or a header of the image tile, or for example, an image tile header, an image slice header, a header of the image encoding unit set, or a header of the image encoding unit.

It should be understood that, the first to-be-processed image area in the step may be preconfigured, or may be adaptively determined in an encoding process. A representation of a range of the first to-be-processed image area may be learned from a protocol of an encoding/decoding side, or a range of the first to-be-processed image area may be received in the bitstream from an encoding side, provided that this corresponds to the encoding side, and no limitation is imposed thereto.

It should be further understood that, in this embodiment of the present application, that the indication information is set to 0 or 1 is for illustration purposes, provided that this corresponds to the encoding side.

S530. Parse the bitstream to obtain second indication information.

The second indication information indicates a prediction mode for a to-be-processed block in the first to-be-processed image area. This step corresponds to step S340 on the encoding side.

S540. Determine, in the set of candidate prediction modes for the first to-be-processed image area, a prediction mode for a to-be-processed image unit according to the second indication information.

A specific method is similar to S320, and details are not described herein again.

S550. Determine a predicted image of the to-be-processed image unit according to the prediction mode.

A specific method is similar to S330, and details are not described herein again.

FIG. 12 is a block diagram illustrating an example of another video decoder 70 for decoding video data, according to one or more technologies of the present application.

The video decoder 70 includes: a first parsing module 71, a first determining module 72, a second parsing module 73, a second determining module 74, and a third determining module 75.

The first parsing module 71 is configured to perform S510 of parsing a bitstream to obtain first indication information.

The first determining module 72 is configured to perform S520 of determining a set of candidate modes for a first to-be-processed image area according to the first indication information.

The second parsing module 73 is configured to perform S530 of parsing the bitstream to obtain second indication information.

The second determining module 74 is configured to perform S540 of determining, in the set of candidate prediction modes for the first to-be-processed image area, a prediction mode for a to-be-processed image unit according to the second indication information.

The third determining module 75 is configured to perform S550 of determining a predicted image of the to-be-processed image unit according to the prediction mode.

Because motion information of adjacent blocks is correlated, there is a very large probability that there is only a translation motion and no affine motion in a same area. In this embodiment of the present application, a set of candidate prediction modes marking an area level is set, avoiding a bit rate of encoding a redundant mode, thereby improving encoding efficiency.

In one or more embodiments, the described functions may be implemented by hardware, software, firmware, or any combination thereof. If the functions are implemented by software, the functions may be stored in a computer-readable medium as one or more instructions or code, or sent by a computer-readable medium, and are executed by a processing unit based on hardware. The computer-readable medium may include a computer-readable storage medium (which corresponds to a tangible medium such as a data storage medium) or a communication medium. The communication medium includes, for example, any medium that promotes transmission of data, by using a computer program, from a place to another place according to a communication protocol. In this manner, the computer-readable medium may generally correspond to: (1) a non-transitory tangible computer-readable storage medium, or (2) a communication medium such as a signal or a carrier. A data storage medium may be any available medium that can be accessed by one or more computers or one or more processors to retrieve an instruction, code, and/or a data structure for implementing the technologies described in the present application. A computer program product may include the computer-readable medium.

By way of example but not limitation, some computer-readable storage media may include a RAM, a ROM, an EEPROM, a CD-ROM, another optical disc storage or magnetic disk storage, another magnetic storage apparatus, a flash memory, or any other medium that can store required program code in a form of an instruction or a data structure and that can be accessed by a computer. In addition, any connection may be appropriately referred to as a computer-readable medium. For example, if an instruction is transmitted from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in the definition of medium. However, it should be understood that the computer-readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc, where the disk generally copies data in a magnetic manner, and the optical disc copies data by using a laser in an optical manner. A combination of the foregoing objects shall further be included in the scope of the computer-readable medium.

An instruction may be executed by one or more processors such as one or more digital signal processors (DSP), a general microprocessor, an application-specific integrated circuit (ASIC), a field programmable gate array (FPGA), or another equivalent integrated or discrete logic circuit. Therefore, the term "processor" used in this specification may refer to the foregoing structure, or any other structure that may be applied to implement the technologies described in this specification. In addition, in some aspects, the functionalities described in this specification may be provided in a dedicated hardware and/or software module configured for encoding and decoding, or may be incorporated into a combined coder-decoder. In addition, the technologies may be completely implemented in one or more circuits or logic elements.

The technologies in the present application may be widely implemented by multiple apparatuses or devices. The apparatuses or devices include a radio handset, an integrated circuit (IC), or an IC set (for example, a chip set). In the present application, various components, modules, and units are described to emphasize functions of an apparatus that is configured to implement the disclosed technologies, but the functions do not necessarily need to be implemented by different hardware units. Precisely, as described in the foregoing, various units may be combined into a coder-decoder hardware unit, or may be provided by a set of interoperable hardware units (including the one or more processors described in the foregoing) in conjunction with appropriate software and/or firmware.

It should be understood that "one embodiment" or "an embodiment" mentioned in the whole specification means that particular features, structures, or characteristics related to the embodiment are included in at least one embodiment of the present application. Therefore, "in one embodiment" or "in an embodiment" appeared throughout the specification does not necessarily refer to a same embodiment. In addition, these particular features, structures, or characteristics may be combined in one or more embodiments by using any appropriate manner.

It should be understood that, in the various embodiments of the present application, sequence numbers of the foregoing processes do not mean execution sequences, and should not be construed as any limitation on the implementation processes of the embodiments of the present application. The execution sequences of the processes should be determined according to functions and internal logic of the processes.

In addition, the terms "system" and "network" may be used interchangeably in this specification. The term "and/or"

in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be further understood that determining A according to B does not mean that B is determined according to A only; and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A video image encoding method performed by a video encoder, comprising:

determining, from a set of candidate prediction modes for a first to-be-processed image area, a prediction mode for a to-be-processed image unit, wherein the to-be-processed image unit belongs to the first to-be-processed image area; wherein first indication information has a value of 0 or 1, and wherein the value of the first indication information is 0 and a set of candidate translational modes is used as the set of candidate prediction modes; and the value of the first indication information is 1 and a set of candidate translational modes and a set of candidate affine modes are used as the set of candidate prediction modes;

determining a predicted image of the to-be-processed image unit according to the prediction mode; and encoding the first indication information and second indication information into a bitstream, wherein the second indication information indicates the prediction mode for the to-be-processed image unit.

2. The method according to claim 1, wherein the first to-be-processed image area comprises one of an image sequence, an image picture, an image tile set, an image slice set, an image tile, an image slice, an image encoding unit set, or an image encoding unit.

3. The method according to claim 1, wherein the set of candidate prediction modes comprises one or more candidate translational modes.

4. The method according to claim 3, wherein when the set of candidate prediction modes further comprises two or more candidate affine modes, the first indication information is 1.

5. A video encoder, comprising:

a non-transitory memory storing instructions; and a processor coupled to the memory to execute the instructions to:

determine, from a set of candidate prediction modes for a first to-be-processed image area, a prediction mode for a to-be-processed image unit, wherein the to-be-processed image unit belongs to the first to-be-processed image area; wherein first indication information has a value of 0 or 1, and wherein the value of the first indication information is 0 and a set of candidate translational modes is used as the set of candidate prediction modes; and the value of the first indication information is 1 and a set of candidate translational modes and a set of candidate affine modes are used as the set of candidate prediction modes;

determine a predicted image of the to-be-processed image unit according to the prediction mode; and encode the first indication information and second indication information into a bitstream, wherein the second indication information indicates the prediction mode for the to-be-processed image unit.

6. The video encoder according to claim 5, wherein the first to-be-processed image area comprises an one of image sequence, an image picture, an image tile set, an image slice set, an image tile, an image slice, an image encoding unit set, or an image encoding unit.

7. The video encoder according to claim 5, wherein the set of candidate prediction modes comprises one or more candidate translational modes.

8. The video encoder according to claim 7, wherein when the set of candidate prediction modes further comprises two or more candidate affine modes, the first indication information is 1.

9. A non-transitory computer-readable storage medium storing a video bitstream that is generated by a method performed by a video encoder, the video bitstream comprises first indication information and second indication information, wherein the first indication information has a value of 0 or 1, and the value of the first indication information is 0 and a set of candidate translational modes is used as a set of candidate prediction modes for a first to-be-processed image area; and the value of the first indication information is 1 and a set of candidate translational modes and a set of candidate affine modes are used as the set of candidate prediction modes for the first to-be-processed image area, and the second indication information is for determining a prediction mode for a to-be-processed image unit from the set of candidate prediction modes, wherein the to-be-processed image unit belongs to the first to-be-processed image area.

10. The non-transitory computer-readable storage medium according to claim 9, the first to-be-processed image area comprises one or an image sequence, an image picture, an image tile set, an image slice set, an image tile, an image slice, an image encoding unit set, or an image encoding unit.

11. The non-transitory computer-readable storage medium according to claim 9, wherein the set of candidate prediction modes comprises one or more candidate translational modes.

12. The non-transitory computer-readable storage medium according to claim 11, wherein when the set of candidate prediction modes further comprises two or more candidate affine modes, the first indication information is 1.

* * * * *